(12) United States Patent
Ichikawa et al.

(10) Patent No.: US 6,229,722 B1
(45) Date of Patent: May 8, 2001

(54) MULTIPLE INVERTER SYSTEM

(75) Inventors: Kosaku Ichikawa; Akio Hirata; Kazuto Kawakami; Kazuhiro Satoh, all of Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/456,317

(22) Filed: Dec. 8, 1999

Related U.S. Application Data

(63) Continuation of application No. 09/168,285, filed on Oct. 8, 1998.

(30) Foreign Application Priority Data

Oct. 9, 1997 (JP) .................................................. 9-277725
Dec. 26, 1997 (JP) .................................................. 9-366818

(51) Int. Cl.[7] .................................................. H02M 7/00
(52) U.S. Cl. .................................................. 363/71
(58) Field of Search .................................................. 363/65, 71, 98, 363/132; 318/801, 803, 811

(56) References Cited

U.S. PATENT DOCUMENTS

| | | | |
|---|---|---|---|
| 4,204,264 | 5/1980 | Lipman | 363/71 |
| 4,212,055 | 7/1980 | Podlewski | 363/71 |
| 4,438,474 | 3/1984 | Paice . | |
| 4,674,024 | 6/1987 | Paice et al. . | |
| 4,695,933 | 9/1987 | Nguyen et al. . | |
| 4,975,822 | 12/1990 | Lipman . | |
| 5,008,797 | 4/1991 | Patel et al. . | |
| 5,099,409 | 3/1992 | Bando et al. . | |
| 5,214,366 | 5/1993 | Hollmann . | |
| 5,625,545 | 4/1997 | Hammond | 363/71 |
| 5,638,263 | 6/1997 | Opal et al. | 363/65 |
| 5,852,554 | 12/1998 | Yamamoto | 363/71 |
| 5,999,428 | * 12/1999 | Dahler et al. | 363/71 |
| 6,014,323 | * 1/2000 | Aiello et al. | 363/71 |

FOREIGN PATENT DOCUMENTS

| | | | |
|---|---|---|---|
| 55-92574 | * 7/1980 | (JP) | 363/71 |
| 2-202324 | 8/1990 | (JP) . | |

OTHER PUBLICATIONS

O.K. Marti, "Wave Shape of 30–and 60–Phase Rectifier Groups", Electrical Engineering, vol. 59, pp. 218–226, Apr., 1940.

Ohno et al., High–Voltage Multiple Phase Thyristor Chopper for Traction Motor Control, iPower IEEE Transactions on Magnetics, vol., Mag–3, No. 3, pp. 232–236, Sep., 1967.

IEEE Recommended Practices and Requirements for Harmonic Control in Electrical Power Systems, IEEE Std. 519–1992.

Halmar Robicon Group Brochure, Dec.,1993.

IEEE Guide for Harmonic Control and Reactive Compensation of Static Power Converters, pp. 21–22, Std. 519–1981.

(List continued on next page.)

Primary Examiner—Matthew Nguyen
(74) Attorney, Agent, or Firm—Banner & Witcoff, Ltd.

(57) ABSTRACT

A multiple inverter system of the present invention is disclosed. It includes a plurality of input transformers having secondary windings and a plurality of unit inverter cells connected in series at n stages to compose respective phases and supply the electric power to a multiple phase load in combination with the input transformers. The input transformers have 3n sets of three-phase windings at the secondary side and the secondary windings of the transformers, which are out-of-phase at each phase, are connected to unit inverter cells of each phase at the n-th stages. Further, the present invention is provided with a bypass switch control to melt a fuse that is applicable to a unit inverter given with a circuit closing command by giving this circuit closing command to a bypass switch corresponding to applicable unit inverters in response to an operation abnormality detector and a DC abnormality detector.

39 Claims, 28 Drawing Sheets

OTHER PUBLICATIONS

Tadakuma et al., "Consideration on Large Capacity PWM Inverter For LSM Drives", 1990.

Ito et al., "A Series of PWM Methods of a Multiple Inverter For Adjustable Frequency Drive", pp. 190–195, 1993.

PESC 88 Record,19th Annual IEEE Power Electronics Specialists Conference, vol. 1, 1988.

Marchesoni et al., "A Nonconventional Power Converter For Plasma Stabilization", PESC'88 Record, pp. 122–129, Apr., 1988.

Marchesoni et al., "Power Conditioning System Using Slide Mode Control"PESC'88 Record, ps. 626–633, Apr., 1988.

Marchesoni, "High Peformance Current Control Techniques for Applications to Multilevel High Power Voltage Source Inverters", PESC Conf. Milwaukee, Wisconsin, Jun. 26–29, 1989.

Marchesoni et al., "Variable Structure Control System Applied to Multilevel Power Conditioning Converters", Proceedings of the European Space Power Conference, Madrid Oct. 2–6, 1989.

Marchesoni et al., "High Power Factor Control System in Multilevel Converters For AC Heavy Traction Drives", Proceedings of the Fifth Annual IEEE Applied Power Electronics Conference and Exposition, Los Angeles, CA Mar. 11–16, 1990.

Marchesoni et al., "A Non Conventional Power Converter for Plasma Stabilization", IEEE Transactions on Power Electronics, vol. 5, No. 2, Apr., 1990.

Marchesoni et al., "A New Multilevel PWM Method: A Theoretical Analysis", PESC'90, San Antonio, Jun., 10–15, 1990.

Marchesoni et al.,"A Modular Approach to Converter Design for High–Power AC Drives", 4th Conference on Power Electronics and Applications, Italy, Sep. 3–6, 1991.

Marchesoni, High Performance Current Control Techniques for Applications to Multilevel High Power Voltage Source Inverters, IEEE Transactions on Power Electronics, vol. 7, No. 1, Jan., 1992.

Marchesoni et al., "A New Multilevel PWM Method: A Theoretical Analysis", IEEE Transactions on Power Electronics, vol. 7, No. 3, Jul., 1992.

Marchesoni, "Modulation Techniques for Converters in a Multi–Level Configuration", Fourth Interactive Seminar on Electrical Microprocessor Controls, Bressanone, Mar. 8–9, 1993, (Italian language original and English Translation).

Marchesoni et al., "Multilevel Converters for High Power AC Drives: A Review", IEEE International Symposium on Industrial Electronics, Budapest, Jun. 1–3, 1993.

Marchesoni, et al., "AC/DC/AC High Voltage Traction Drives with Quasi–Zero Reactive Power Demand", IEEE Transactions on Power Electronics, vol. 8, No. 4, Oct., 1993.

Marchesoni et al., Development and Use of a New Object Oriented Simulator for Analysing Industrial Plant Power and Control System, 7th Mediterranean Electrotechnical Conference, Turkey, Apr. 12–14, 1994.

Marchesoni et al.,A Low Cost Microcontroller Based System for High Performance AC Motor Drives Developement, 20th International Conference on Industrial Electronics Control and Instrumentation, Italy, Sep. 5–9, 1994.

Marchesoni et al., "Sliding Mode Multilevel Control for Improved Performances in Power Conditioning Systems", IEEE Transactions on Power Electronics, vol. 10, No. 4, Jul., 1995.

Marchesoni et al., "Analysis and modeling of the Auxilary Quasi–Resonant DC Link Inverter applied to ac electric vehicle drives", ISIE'95 Proceedings of the IEEE International Symposium on Industrial Electronics, Greece, Jul.10–14, 1995.

Marchesoni et al., "Exploitation of Low–Cost Microcontroller Potentialities to Develop Fully Digital Rotor Flux Oriented Induction Motor Drives", Proceedings of the 1995 IEEE IECON, 21st International Conference on Industrial Electronics, Control, and Instrumentation, vol., 1995.

Marchesoni et al., "High Computational Power And Great Interfacing Capability For Electric Drives Control: A New Surface–Mount DSP Based System", 8th Mediterranean Electrotechnical Conference, Italy, May 13–16, 1996.

Marchesoni et al., "Implementation of a Sensorless Stator Flux Oriented Asynchronous Motor Drive with High Perfomances at Low–Speed Operation", 27th Annual IEEE Power Electronics Specialists Conference, Italy, Jun. 23–27, 1996.

Marchesoni et al., "An Induction Motor Drive with Stator Flux Oriented Control Low–cost Implementation", IEEE, pp. 168–173, 1996.

Marchesoni et al., Experimental Study of a Power Conditioning System Using Slide Mode Control, IEEE Transactions on Power Electronics, Portugal, Jul. 7–11,1997, vol. 11, No. 5, 1996.

Marchesoni et al., "Optimization of Harmonic Performances in Multilevel Converter Structures", Proceedings of the IEEE International Symposium on Industrial Electronics, Portugal, Jul. 7–11, 1997.

Marchesoni et al., "A Simple Approach to Flux and Speed Observation in Induction Motor Drives", IEEE Transactions on Industrial Electronics, vol. 44, No. 4, Aug., 1997.

Marchesoni et al., "A New Approach In Multilevel Power Conversion", 7th European Conference on Power Electronics and Applications, Norway, Sep. 8–10, 1997.

Marchesoni et al., "A Microcontroller–Based Sensorless Stator–Flux Oriented Asynchronous Motor Drive for Traction Applications", IEEE Transactions on Power Electronics, vol. 13, No. 4, Jul., 1998.

* cited by examiner

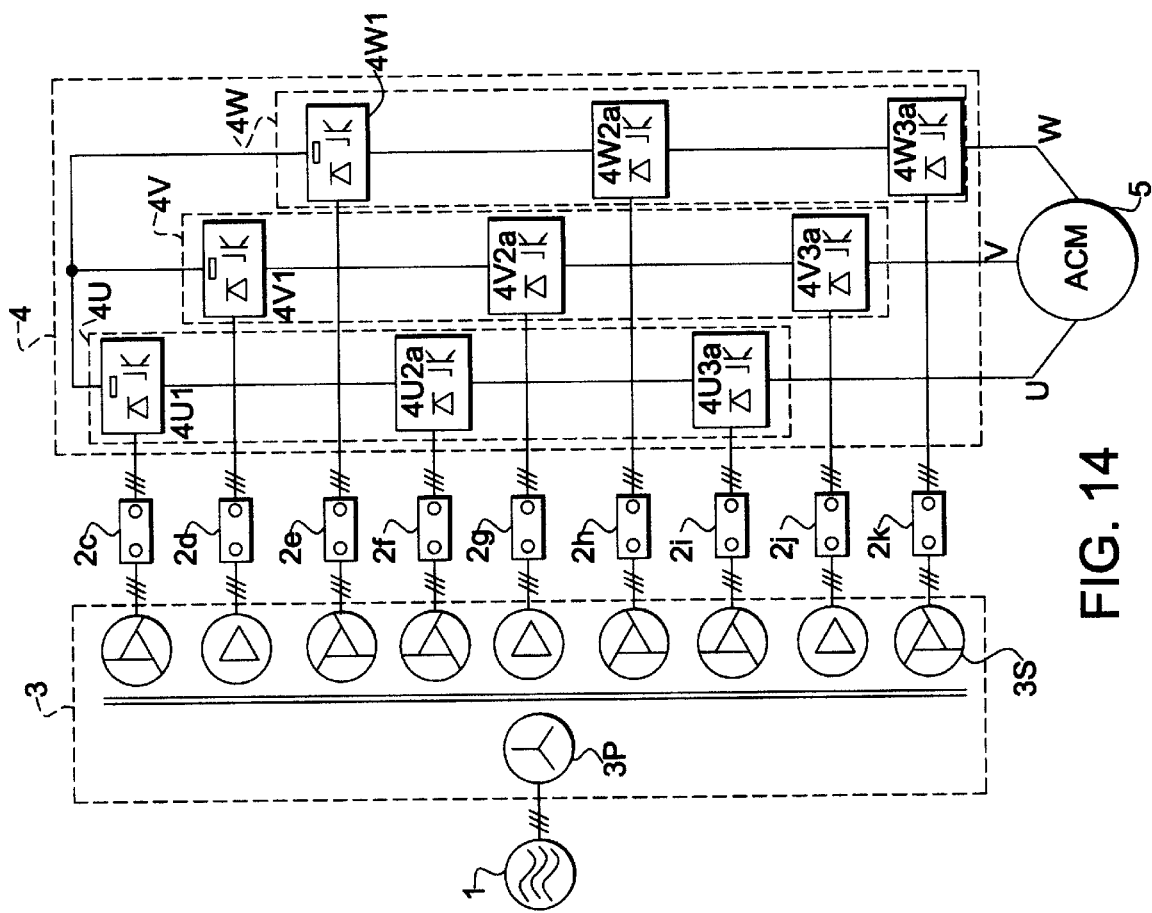
FIG. 14
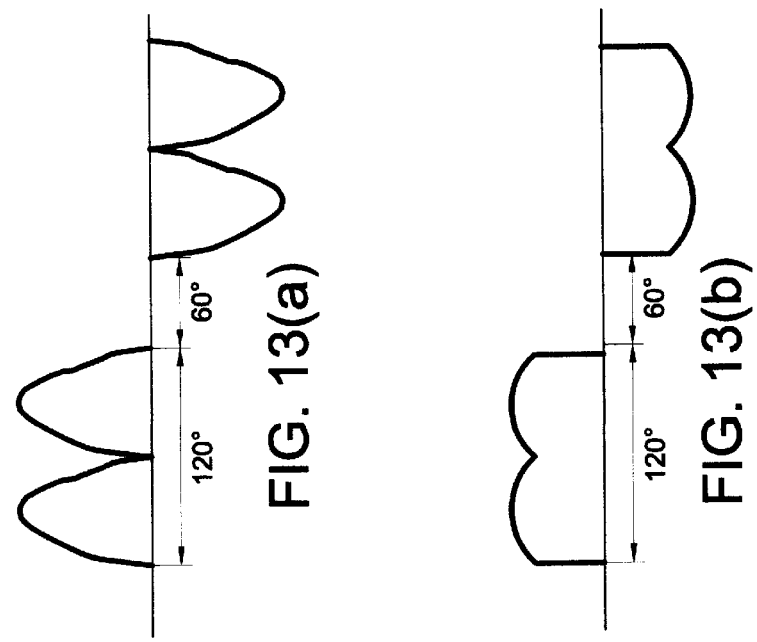
FIG. 13(a)
FIG. 13(b)

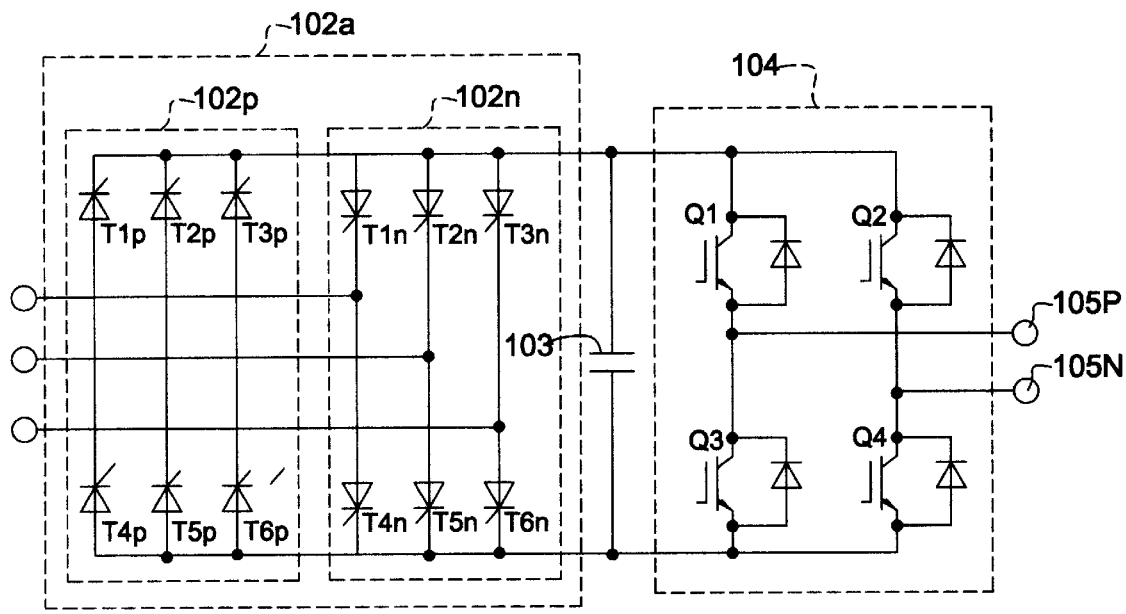
FIG. 26
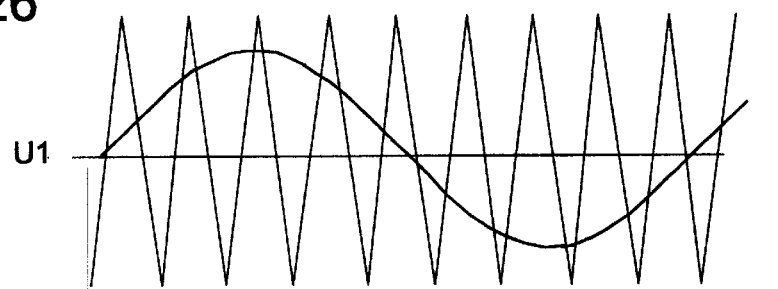
U1
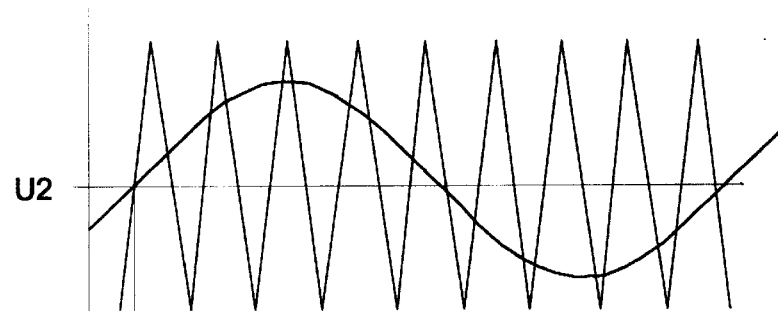
U2
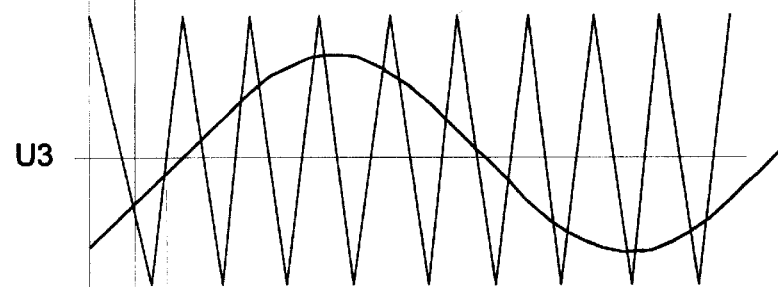
U3
−20° 0° +20°   FIG. 28

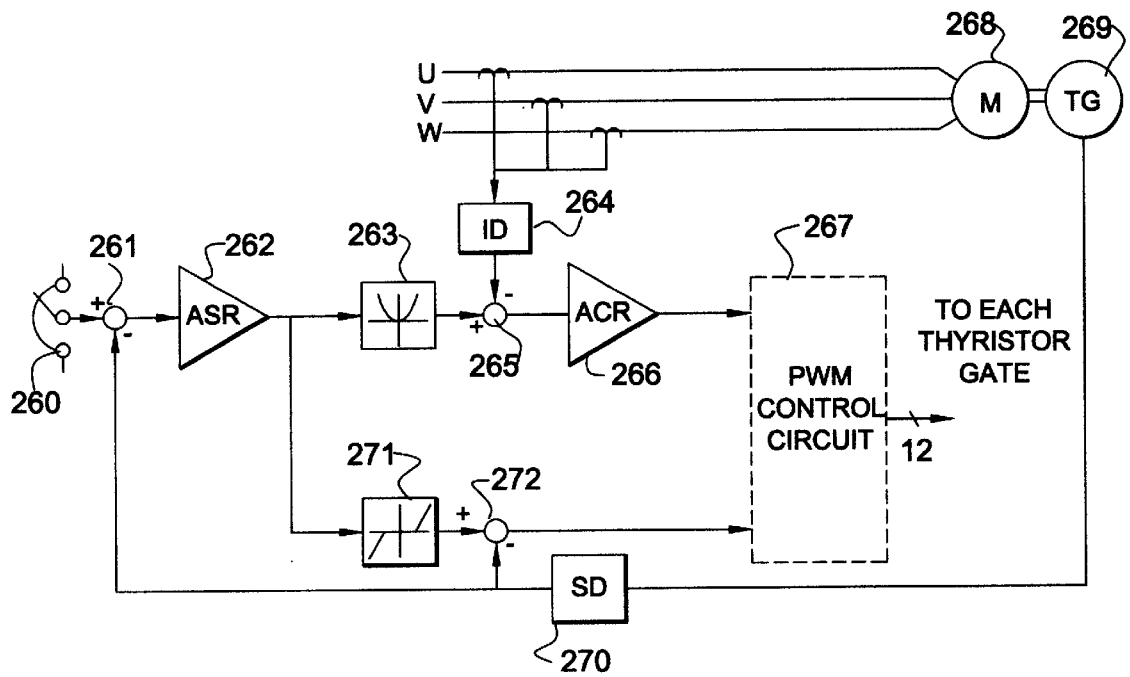
FIG. 29
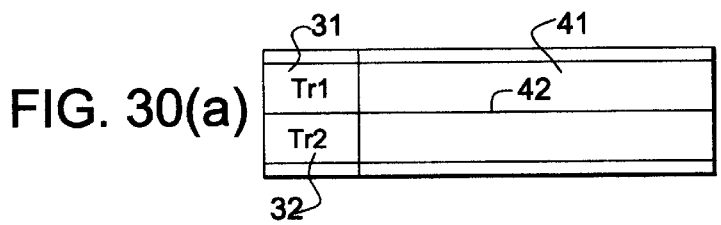
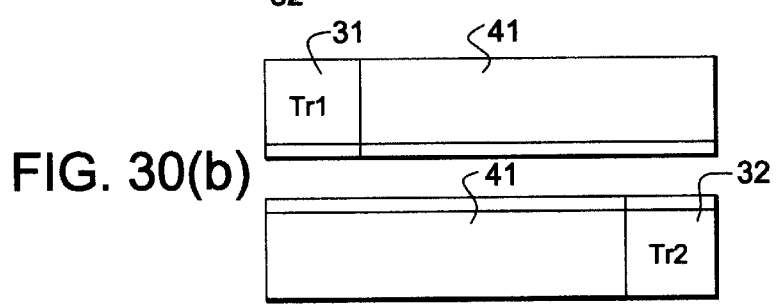
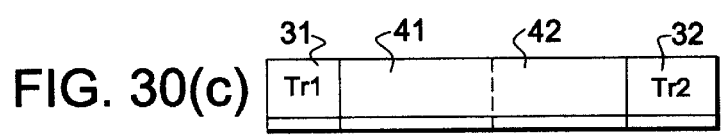
FIG. 30(a)
FIG. 30(b)
FIG. 30(c)

MULTIPLE INVERTER SYSTEM

This application is a Continuation of Ser. No. 09/168,285 filed Oct. 8, 1998.

BACKGROUND OF THE INVENTION

1. Field of the Invention

The present invention relates to an inverter system to obtain several kV high voltage outputs and more particularly to a multiple inverter system designed to obtain high voltage output using a plurality of unit inverters.

2. Description of the Related Art

So far, there are many needs for energy saving by variable speed drive operation of AC motors, particularly, existing high-voltage motors. In particular, a high-voltage driving system is demanded, which is applicable directly to existing high-voltage motors; e.g., 3 k system, 6 kV system in Japan and 4.2 kV system and 2.4 kV system in overseas.

A general method so far used to construct a power conversion system for obtaining high voltage is a method to connect secondary windings of a plurality of transformer in series as described in Section 3 of the technical report titled "Multiple-Power Converter and Application Technology thereof" published from The Institute of Electrical Engineers of Japan (July, 1995).

An example of a high-voltate 12-phase inverter system that is so far often used is shown in FIG. 1.

This inverter system is composed of a rectifier 110, which converts AC to DC, a DC smoothing circuit 120 comprising a reactor 121 and a capacitor 122, inverter circuits 130 and 131, which convert DC to AC of optional frequency, transformers 140 and 141 and a load 150.

This circuit is in a structure that DC output of the rectifier 110 is commonly used, a plurality of inverter circuits 130, 131 are provided for this DC voltage and the secondary side windings of the output transformers 140, 141 are connected in series so as to obtain a desired high voltage.

A control circuit is composed of a speed command unit 162, a transmitter (OSC) 163, which decides the output frequency in the inverter circuits 130, 131, a distributor (RING) 164, which distributes the signal from the transmitter 163 to semiconductor devices in the inverter circuits 130, 131, an amplifier 165, a voltage control circuit (AVR) 166, a phase shifter (PHC), which decides a gate signal phase of the rectifier 110, a voltage detecting transformer 143, which detects the output AC voltage of the output transformers 140, 141 and the voltage detected by the voltage detecting transformer 143 is input to one of the input terminals of a comparator 134 via a reverse current preventing diode 144, a command from the speed commanding unit 162 is input to the other input terminal of the comparator 145 and a deviation obtained by the comparator 145 is given to a voltage control circuit 166.

A circuit shown in FIG. 2 is in a structure to obtain a high-voltage by combining a plurality of mutually insulated inverter circuits 130, 131 by the output transformers 140, 141, and excepting these elements, other component elements which are the same as those shown in FIG. 1 are assigned with the same reference numerals used in FIG. 1 and their explanations are omitted.

This circuit is in such a structure that an inverter circuit is provided to each of the outputs from the rectifiers 110, 111 and the secondary windings of the output transformers are connected in series so as to obtain a desired high-voltage.

In the case of the structure shown in FIG. 1 and FIG. 2, the output transformers 140, 141 are required for the outputs of the inverter circuits 130, 131, respectively and therefore, an area needed for installing them becomes large. Furthermore, to make the output transformers 140, 141 to be durable for the use from low frequency, there is such a defect that their external shape becomes larger than ordinary transformers of fixed frequency.

Further, a neutral point clamped 3 level inverter shown in FIG. 3 has been developed and put in practical use in recent years. This inverter converts the AC output from an AC power source 11 into DC by a rectifier 12 and after smoothed by capacitors 13, 14, supplies AC output obtained from a 3 level inverter circuit using 3 sets of a circuit comprising self-turn-off semiconductor devices S1~S4 composed of, for instance, a gate turn-off thyristor (GTO) and diodes D1~D6 to a load motor 16. Further, P, N indicate control buses and C indicates a neutral-point potential.

A multiple level inverter as shown in FIG. 3 has an economical problem that the connection of semiconductor devices in series becomes necessary because the circuit voltage becomes equivalent to the output voltage and a size of the system becomes large because the dielectric strength becomes high.

For a conventional system in the structure as described above, there exist such problems as shown below. As techncal problems when comprising a high-voltage converter, the following matters are pointed out.

(1) If an inverter circuit is constructed without connecting semiconductor devices in series, an output transformer are required, which is not economical.

(2) If an inverter circuit is constructed by connecting semiconductor devices in series, an output transformer can be eliminated but the system may not become fully reliable because it becomes necessary to select semiconductor devices that are to be connected in series and the gate control becomes complicate.

(3) In the serially connected structure of semiconductor devices, the harmonic reduction is limited as a matter of course because the output side harmonic componet is decided by PWM switching frequency of semiconductor devices.

(4) If even one of a lot of semiconductor devices comprising the main circuit becomes defective, the continuous operation of the system becomes impossible and and it becomes a problem in a system demanded for the continuous operation.

Further, in particular, when the high-votage output obtained by connecting the ouput sides of a plurality of unit inverters in series is supplied to an AC load, there are problems as shown below.

FIG. 4 shows an example of a definite circuit using a this type of conventional multiple inverter system. The structure shown in FIG. 4 will be described below. That is, this circuit is provided with a rectifier 2, which converts AC voltage of an AC power source A1 into DC voltae, a unit inverter, which converts DC power of the rectifier A2 into AC power, connected to the rectifier A2 in parallel with it via a smoothing capacitor A3, provided with four bridge connected semiconductor devices A5, A6, A7, A8 of, for instance, IGBT and the like and a gate controller A40 to give a firing command in the specified order to the semiconductor devices A5~A8 comprising the unit inverter A9.

Although not shown in FIG. 4, a pluality of the unit inverters 9 including the same smoothing capacitor A3 as the structure described above are provided, the input sides of the unit inverters A9 are connected to the rectifier A2 in parallel with it and the output sides of the unit inverters A9 are connected in series, and an AC load A10 that is, for instance, an induction motor is connected to the ouput side of the thus connected multiple inverter.

The unit inverter A9 is provided with a bypass circuit described below to protect the unit inverter A9. The bypass circuit is connected between the buses of the input side of the AC load A10 and is composed of a bypass switch A41 comprising, for instance, a thyristor, a diode bridge comprising diodes A42, A43, A44, A45 connected between the pypass switch A41 and the AC load A10, a current detector A46 to detect load current and a switch operating circuit A47 which gives an ON command to the bypass switch A41 when the current value detected by the current detector A46 exceeds a specified value.

The byass circuit is also incorporated in other unit inverters (not shown) than the unit inverter A9.

In FIG. 4, when the unit inverter A9 is in the normal state without causing a short-circuit, etc., the bypass switch A41 is kept in the OFF state and it therefore performs nothing.

However, when the semiconductor devices A5, A8 of one of a plurality of unit inverters A9 are not short-circuitted completely but short-circuitted except, for instance, the IGBT bonding wire, the current value detected by the current detector A46 exceeds a specified value and therefore, the switch operating circuit A47 operates and the pypass switch A41 is turned ON. As a result, the short-circuit current flowing to the load A10 flows in the direction of arrow.

The operation described above is in the case of an ideal circuit where there is no delay in the operation for the period when the current detector A46 detects an abnormality of the unit inverters A9 and turns the bypass switch A41 ON. Therefore, the short-circuit current flows to the AC load A10 as a result of the short-circuit of the unit inverter A9, unless the operation of the short-circuitted unit inverter A9 is once stopped, the AC load A10 can be burnt out.

SUMMARY OF THE INVENTION

The present invention has been made to improve such the problems as described above and one of the objects of the present invention is to provide an economical multiple inverter system, which requires no output transformer, is small in size but capable of obtaining a high-voltage output, reducing higher harmonic to a load side and also, reducing harmonic current of the input power source.

Further, another object of the present invention is to provide a multiple inverter system capable of continuously operating an AC load even when a short-circuit and other troubles are taken place on at least one of unit inverters without suspending the operation of the remaining good unit inverters.

In order to achieve the above-mentioned objects, in a multiple inverter system of the present invenion, comprising each phase by connecting a plurality of input transformers having secondary windings and unit inverter cells in series for n stages and supplying electric power to multiple phase loads in combination with the input transformers, the input transformer has 3 n sets of three-phase windings at the secondary side and the secondary windings of the transformers which are out-of-phase at each phase are connected to unit inverter cells of all phases at the n-th stage.

Further, in order to achieve the above-mentioned objects, a multiple inverter system of the present invention is provided with input transformers having 3 n sets of three-phase secondary windings, at least one three-phase inverter and a plurality of single-phase inverter cells, which are serially connected for a plurlaity of stages (n−1) to form multiple phases and are connected to the same phase of the three-phase inverter and supply the electric power to a multiple phase load.

According to the present invention, when transformers having multiple secondary windings are combined with unit inverter cells, it is possible to obtain an economical multiple inverter system, which requires no output transformers and is capable of obtaining high voltage output from a small sized system, and reducing higher harmonic to a load side as well as harmonic current of a power source system.

Further, in order to achieve the above-mentioned objects, a multiple inverter system of the present invention is in a structure that n units of input transformers are provided for n unit of serially connected unit inverter cells for each phase, each of the transformers has 3 sets of three-phase windings which are $\pi/3n$ shifted in phase each other at the secondary side and the secondary windings which are out-of-phase at each phase are connected to the unit inverter cells at the n-th stage of each phase.

Further, in order to achieve the above-mentioned objects, a multiple inverter system of the present invention comprises: rectifiers which convert AC power into DC power, a plurality of voltage source unit inverters which convert DC power of rectiviers into AC power and are connected with a plurality of bridge connected semiconductor devices, a group of unit inverters of which input sides are connected in parallel to the rectifiers via smoothing capacitors respectively and the output sides are connected in series and to AC load, fuses serially connected between the rectifiers and the unit inverters, bypass switches connected to the unit inverters in parallel with them and form a circuit to circulate load current when it is electrically closed, a pulse width modulation unit inverter control means to give a firing command in the specified order to semiconductor devices comprising the unit inverters, an abnormality judging means to judge a fault relative to the unit inverter control means and when the abnormality judging means judges the abnormality, and a bypass control means to melt a fuse by giving a circuit closing command to the bypass switch of the applicable unit inverter when the abnormality judging means judges the abnormality.

Further, in order to achieve the above-mentioned objects, a multiple inverter system of the present invention comprises: rectifiers which convert AC power into DC power, a plurality of voltage source unit inverters which convert DC power of rectifiers into AC power, comprising a plurality of bridge connected semiconductor devices, a group of unit inverters of which input sides are connected in parallel to the rectifiers via smoothing capacitors and the output sides are connected in series and further to an AC load, fuses serially connected between the rectifiers and the unit inverters, bypass switches connected to the unit inverters in parallel with them and form a circuit to circulate load current when it is electrically closed, a pulse width modulation unit inverter control means to give a firing command in the specified order to semiconductor devices comprising the unit inverters, an abnormal operation detecting means to detect the abnormal operating state of the unit inverter based on the AC output of the unit inverter, a DC abnormality detecting means to detect the abnormality of DC input of the unit inverter and a bypass switch control means to melt the fuse by giving a circuit closing command to the bypass switch corresponding to applicable unit inverter, and operates by increasing a modulation factor of the unit inverter in the phase causing the abnormality out of the group of inverters to more than one time by the unit inverter control means.

Further, in order to achieve the above-mentioned objects, a multiple inverter system of the present invention comprises: rectifiers which convert AC power into DC power, a plurality of voltage source unit inverters which convert DC power of rectifiers into AC power, comprising a plurality of bridge connected semiconductor devices, a group of unit inverters of which input sides are connected in parallel with the rectifiers via smoothing capacitors and the output sides are connected in series and further to an AC load, fuses serially connected between the rectifiers and the unit inverters, bypass switches connected to the unit inverters in parallel with them and form a circuit to circulate load current when it is electrically closed, a pulse width modulation unit inverter control means to give a firing command in the specified order to semiconductor devices comprising the unit inverters, an abnormal operation detecting means to detect the abnormal operating state of the unit inverter based on the AC output of the unit inverter, a DC abnormality detecting means to detect the abnormality of DC input of the unit inverter and a bypass switch control means to melt the fuse by giving a circuit closing command to the bypass switch corresponding to applicable unit inverter, and operates the number of inverters in the healthy phase corresponding to the number of inverters in the phase detected by the abnormal operation detecting means.

BRIEF DESCRIPTION OF THE DRAWINGS

A more complete appreciation of the present invention and many of the attendant advantages thereof will be readily obtained as the same becomes better understand by reference to the following detailed description when considered in connection with the accompanying drawings, wherein:

FIG. 13 is a signal waveform diagram for explaining an eighth embodiment of a multiple inverter system of the present invention;

FIG. 14 is a circuit diagram for explaining a ninth embodiment of a multiple inverter system of the present invention;

FIG. 26 is a circuit diagram for explaining a twentieth embodiment of a multiple inverter system of the present invention;

FIG. 28 is a signal waveform diagram for explaining a twnty-second embodiment of a multiple inverter system of the present invention;

FIG. 29 is a circuit diagam for explaning a twenty-third embodiment of a multiple inverter system of the present invention;

FIG. 30 is a diagram for explaining a twenty-fourth embodiment of a multiple inverter system of the present invention;

DETAILED DESCRIPTION OF THE PREFERRED EMBODIMENTS

Figure 1:
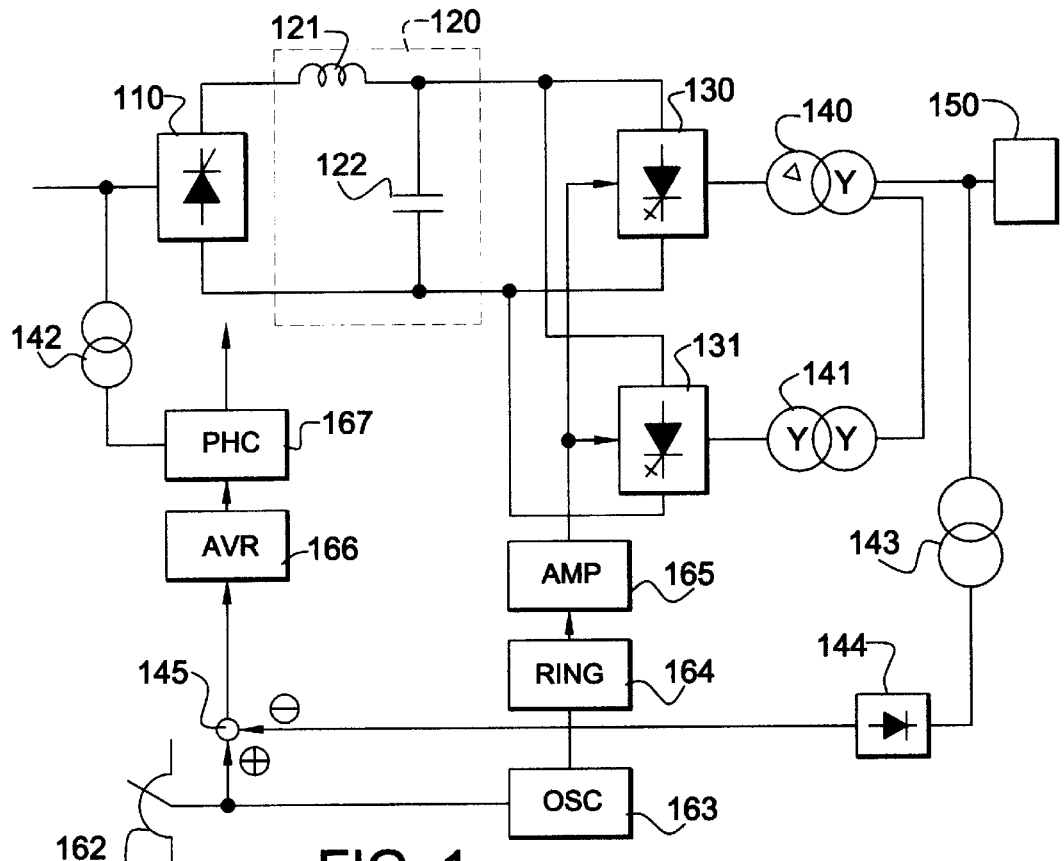
FIG. 1 is a circuit diagram for explaining a first example of a convenional multiple inverter system.

Referring now to the drawings, wherein like reference numerals designate identical or corresponding parts throughout the several views, and more particularly to FIG. 5 thereof, one embodiment of he present invention will be described.

First Embodiment

Figure 5:
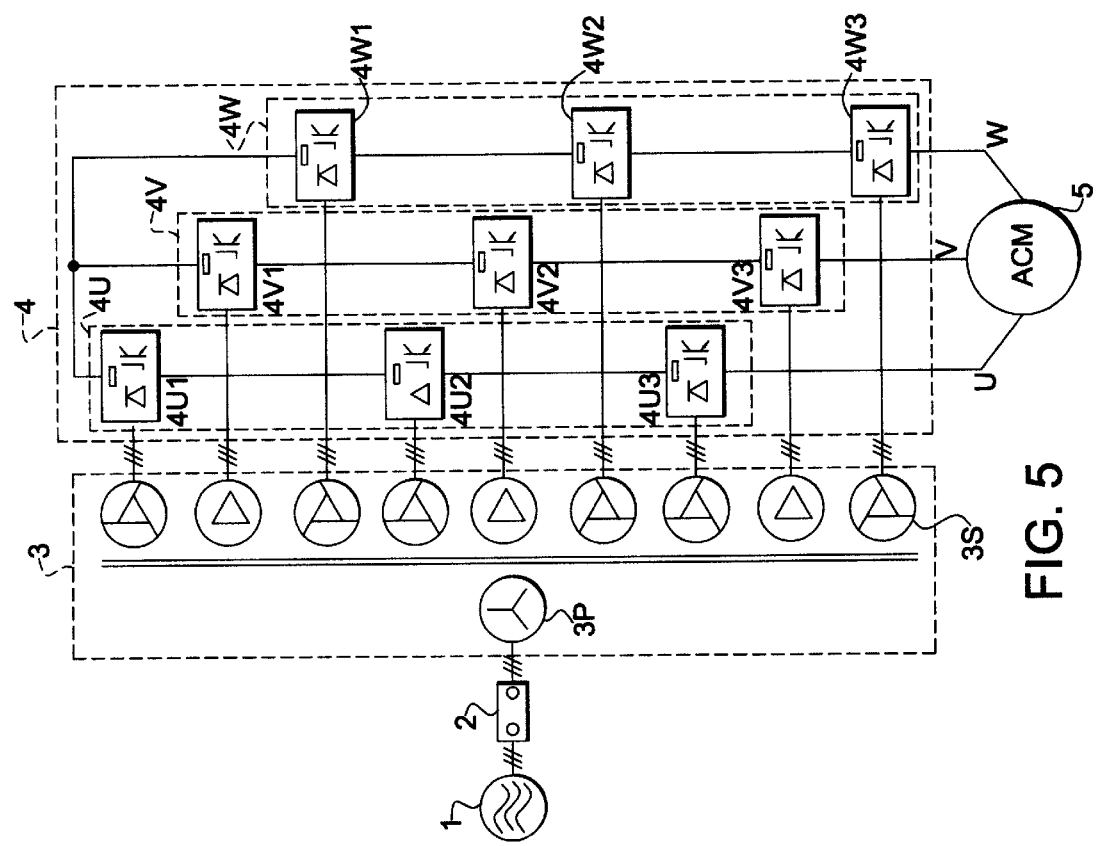
FIG. 5 is a circuit diagram for explaining a first embodiment of a multiple inverter system of the present invention.

FIG. 5 is a circuit diagram showing the first embodiment of the present invention. The multiple inverter system shown here comprises a commercial AC power souce 1, a switch 2, an input transformer 3 having 3 n sets of three-phase secondary windings 3P and 1 set of a primary winding 3S and unit inverter cells 4U1~4U3, 4V1~4V3, 4W1~4W3, which are provided in n (3, here) stages in order to comprise U, V and W phases of phase output lines connected to multiple phase load 5.

In FIG. 5, the secondary windings 3S of the input transformer 3 are provided in 3 sets of windings in 18 phase structure of whih electrical angles are 20 deg. out of phase each other and each set is connected to the same stage of the unit inverter comprising each phase.

When unit inverters are connected as described above, the harmonic componets of input currents become the same without destroying the 18 phase structure even when the n-th stage of each phase is bypassed.

In FIG. 5, the zigzag-delta connection of the secondary windings 3S of the input transformer 3 is shown but the zigzag-star connection is also possible. Further, according to the first emodiment, when the input transformer 3 having a plurality of secondary windings 3S and unit inverters 4U1~4U3, 4V1~4V3 and 3W1~4W3 are combined, the following actions and effects are obtained.

Figure 2:
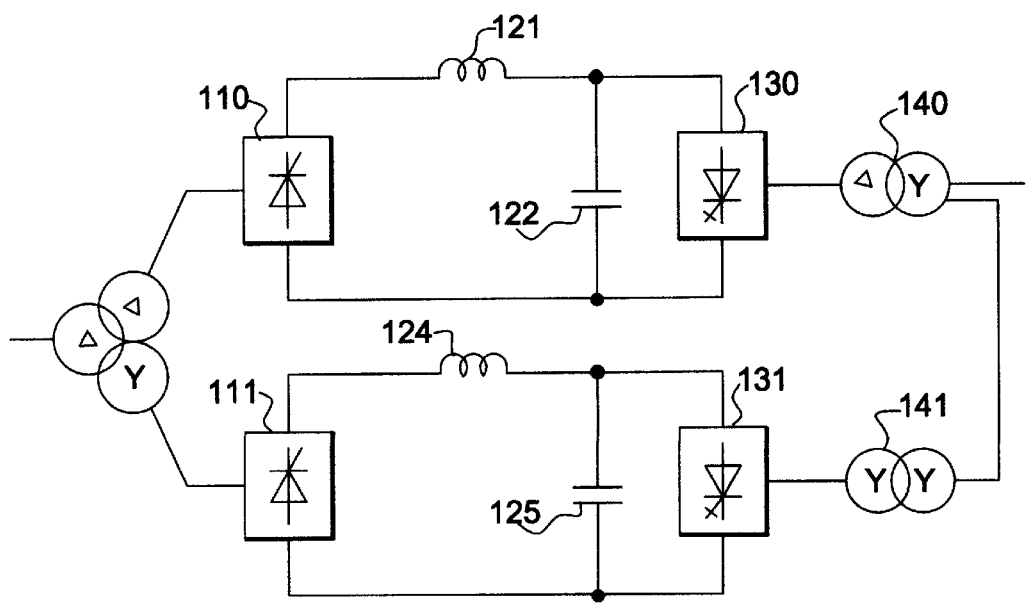
FIG. 2 is a circuit diagram for explaining a second example of a conventional multiple inverter system.
Figure 3:
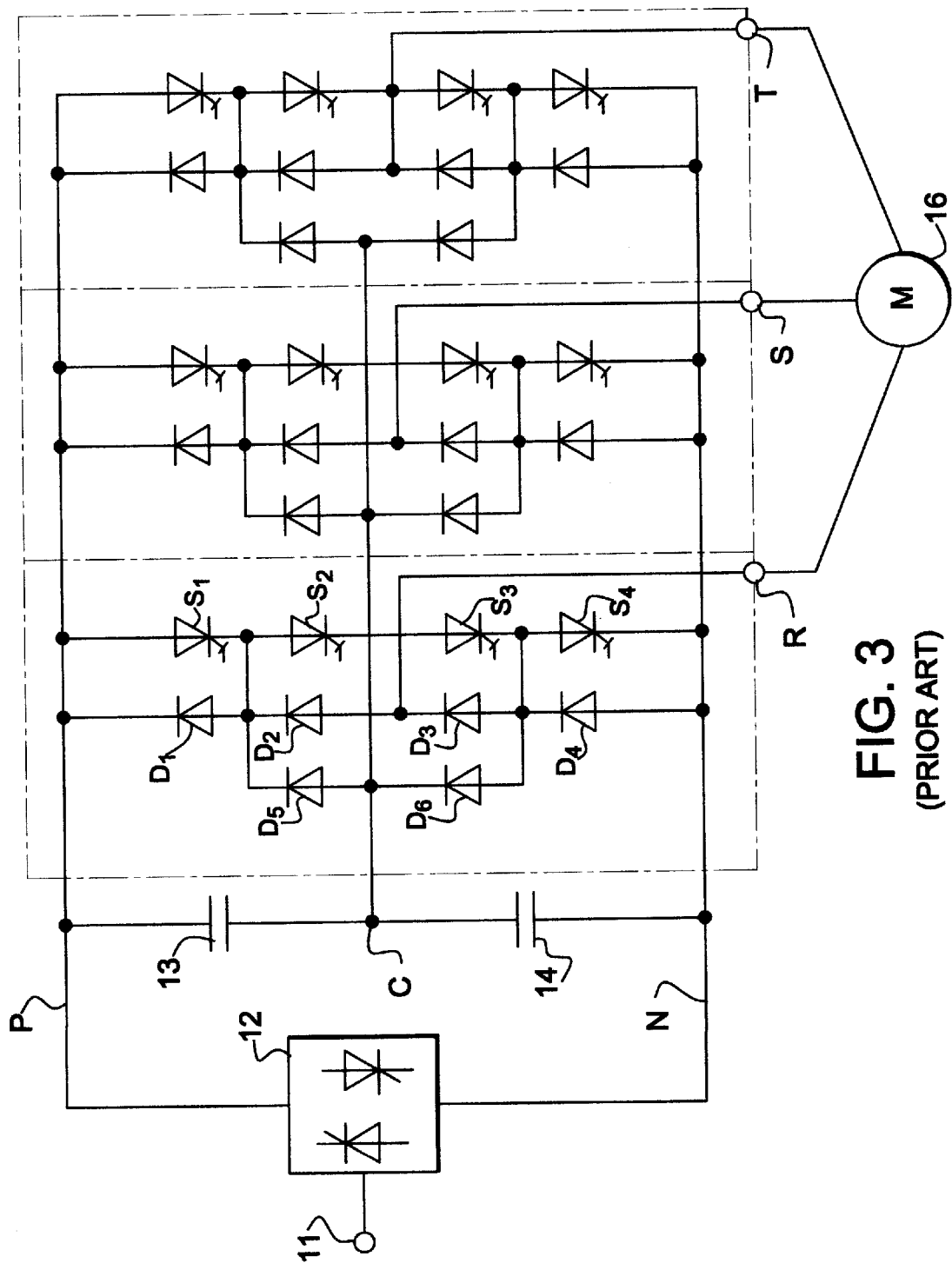
FIG. 3 is a circuit diagram for explaining a third example of a conventional multiple inverter system.
Figure 4:
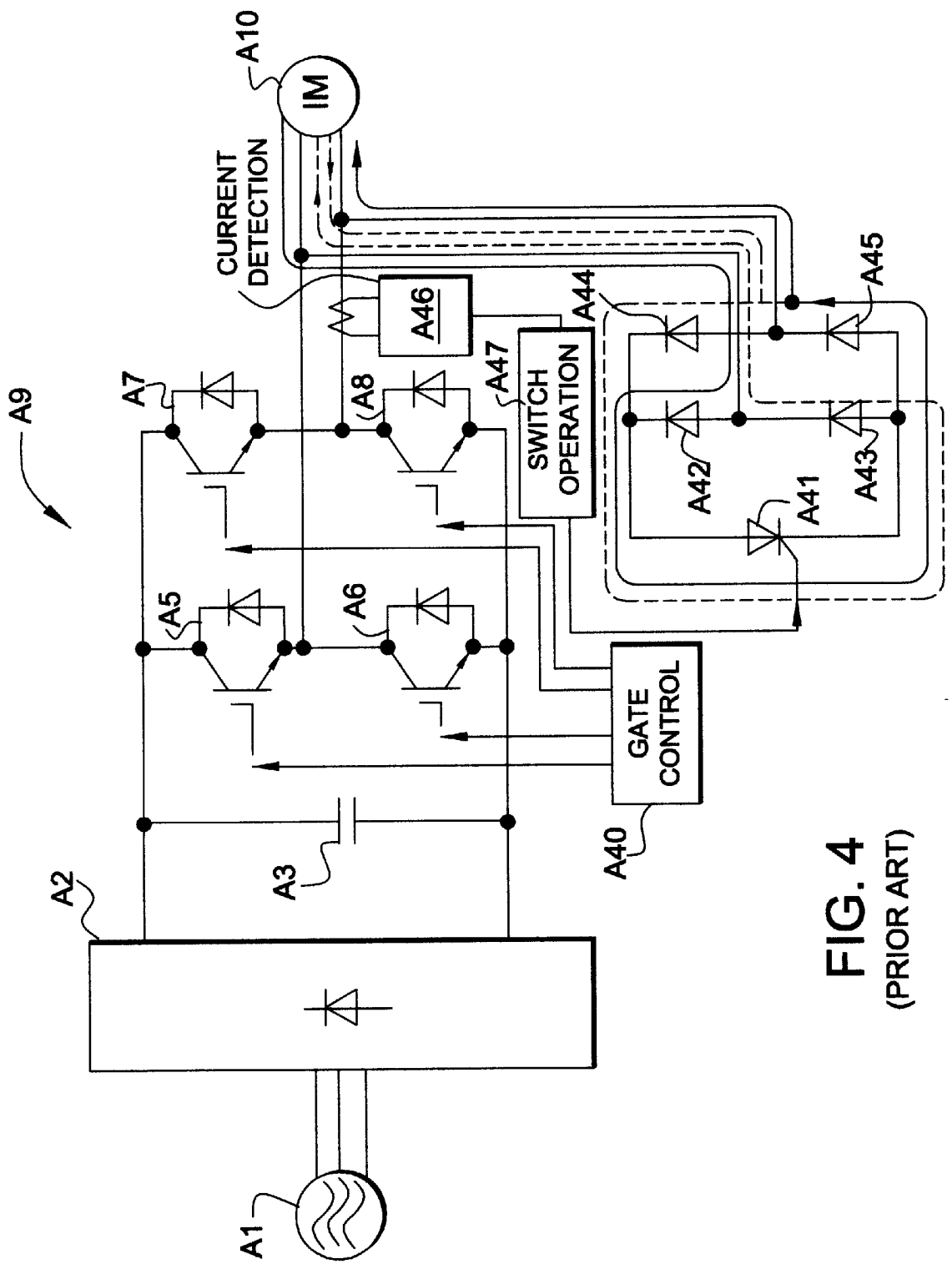
FIG. 4 is a circuit diagram showing essential portions only for explaining a conventional multiple inverter system.

(1) Output transformers (140, 141 in FIG. 1 and FIG. 2) which were so far required are no longer needed and a high-voltage output is obtained from a small-sized inverter system.

(2) As the unit inverter cells 4U1~4U3, 4V1~4V3, 4W1~4W3 are used, it is no longer needed to select serially connected semiconductor devices as before and as the gate control becomes easier and the circuit voltage becomes low, the reliability of the system is improved.

(3) As the unit inverter cells 4U1~4U3, 4V1~4V3, 4W1~4W3 are used, in the structure where semiconductor devices are connected in series, the higher harmonic component at the output side is decided by PWM switching frequency of semiconductor and therefore, the reduction of harmonic wave is restricted naturally, which is so far a problem, can be improved.

(4) As the unit inverter cells 4U1~4U3, 4V1~4V3, 4W1~4W3 are used, a trouble that the continuous system operation becomes impossible if any one f many semiconductor devices comprising that main circuit, which was so far a problem, can be improved.

Second Embodiment

Figure 6:
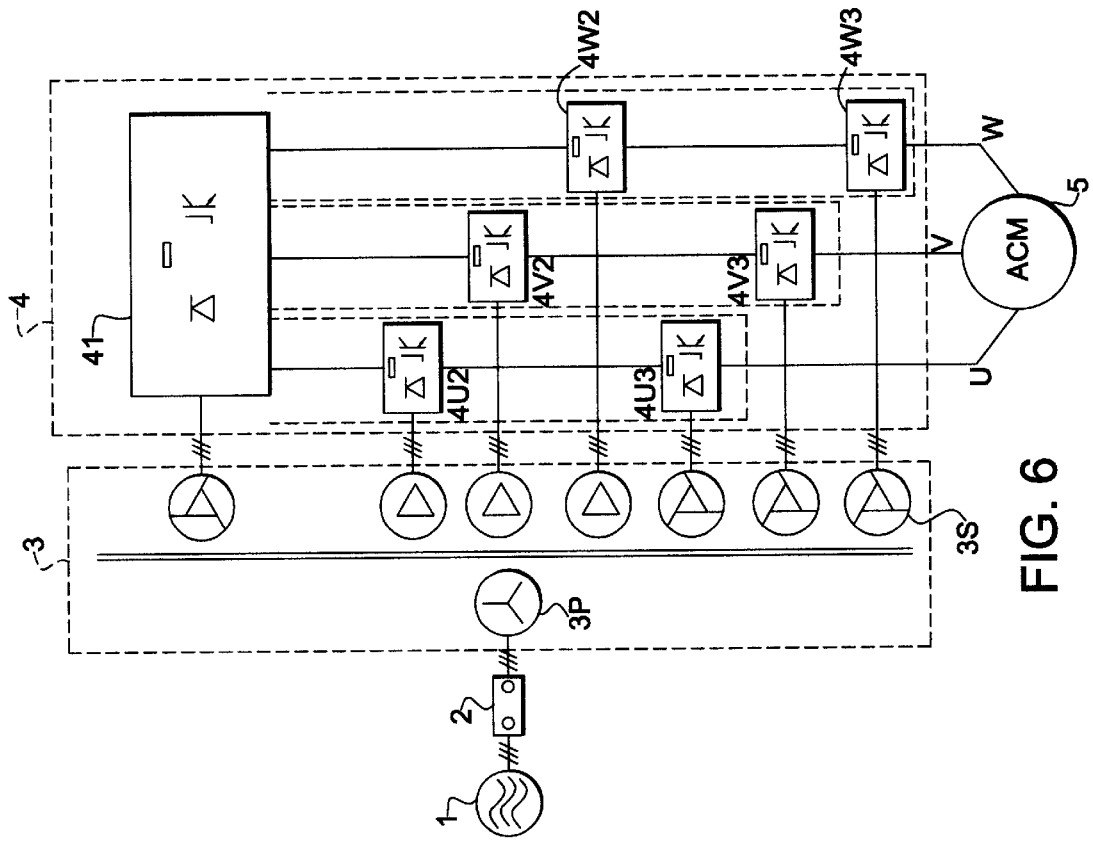
FIG. 6 is a circuit diagram for explaining a second embodiment of the multiple inverter system of the present invention.

FIG. 6 is a circuit diagram showing the second embodiment of the present invention and the same reference numerals as those shown in FIG. 5 indicate the same elements. This circuit differs from FIG. 5 in that it is composed of one set of three-phase inverter 41 and a plurality of single-phase unit inverters 4U2, 4U3, 4V2, 4V3, 4W2, 4W3.

As other constructions, an input transformer 3 having 3n sets of three-phase secondary winding 3S is provided, singple-phase inverter cells 4U2, 4U3, 4V2, 4V3,4W2, 4W3 are connected in series for plural stages (n–1) to construct each phase, which is connected to the same phase, and the electric power is supplied to the multiple phase load 5.

Figure 7:
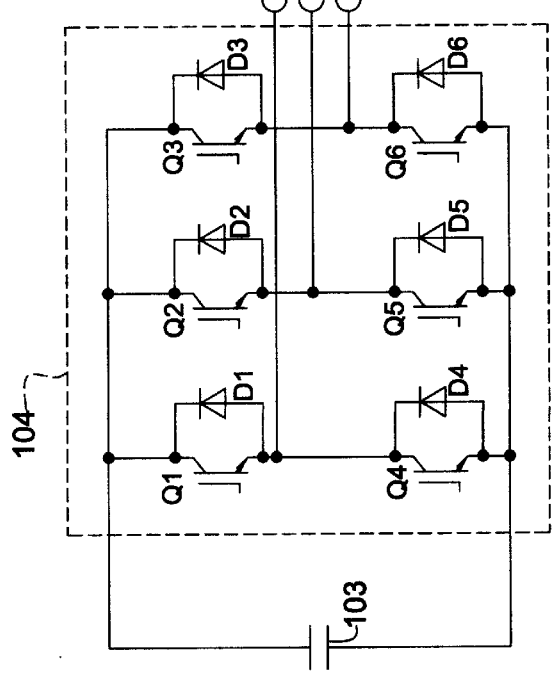
FIG. 7 is a circuit diagram of an inverter for explaining a second embodiment of a multiple inverter of the present invention.

FIG. 7 shows an example of the circuit of the three-phase inverter 41 shown in FIG. 6. In this circuit, for instance, self-turn-off semiconducor devices Q1, Q2, Q3, Q4, Q5, Q6 such as IGBT are bridge connected, diodes D1~D6 are connected to semiconductors Q1~Q6 in parallel and thus a three-phase inverter circuit 104 is constructed and terminals 105U, 105V, 105W are connected to its output side. A DC power source 103 is to be connected to the input side of the three-phase inverter circuit 104. As the operation of the three-phase inverter circuit is omitted here as it is well known.

The three-phase inverter 41 and single-phase inverter cells of the (n–1)th stage connected in-series are connected with the π/3n out of phase secondary windings 3S of the transformer 3.

Thus, the same effect as the embodiment described above is obtained. In addition, in this embodiment it is especially possible to reduce the number of unit inverters and the number of windings of the input transformer 3 and to make the system small in size.

Further, it is possible that a neutral point clamped inverter is composed by the unit inverters.

Third Embodiment

Figure 8:
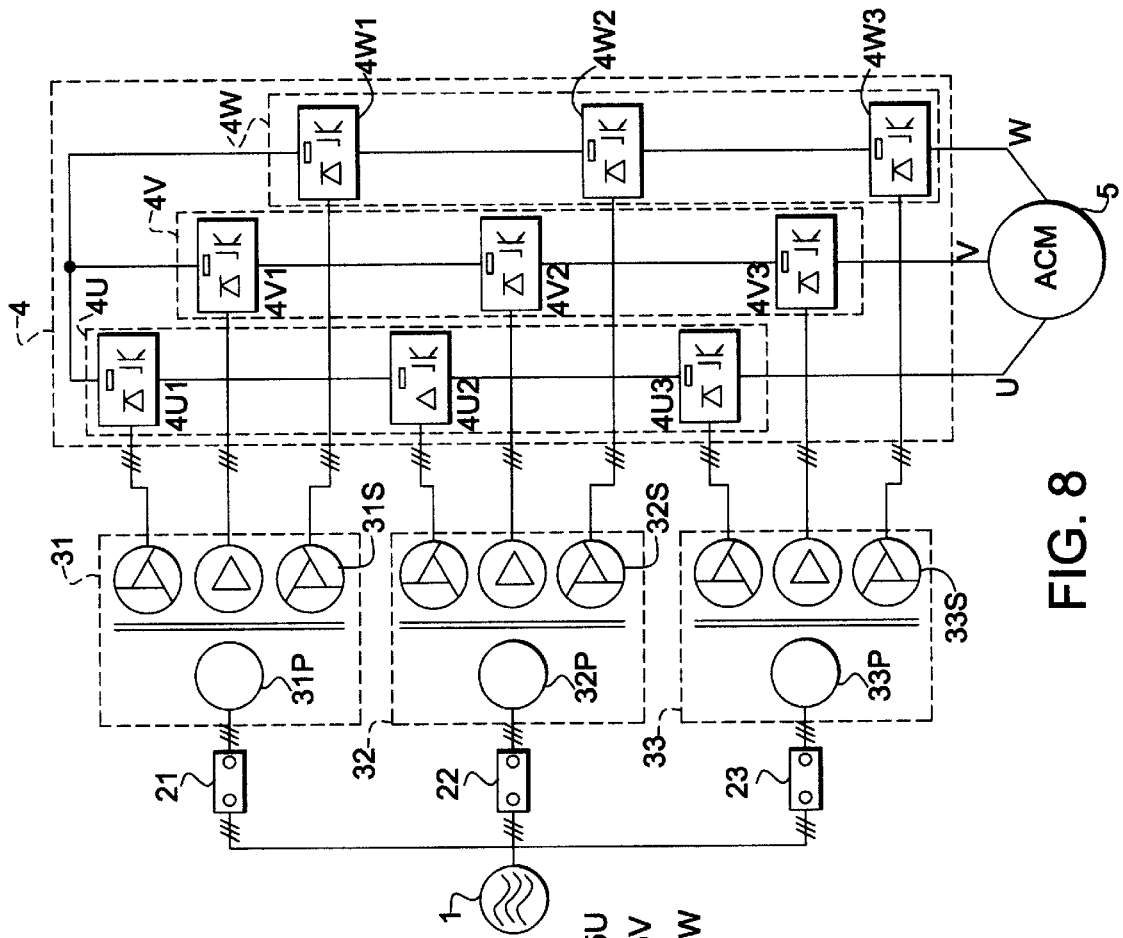
FIG. 8 is a circuit diagram for explaining a third embodiment of a multiple inverter system of the present invention.

FIG. 8 is a circuit diagram showing the third embodiment of the present invention. In this circuit, three input transformers 31, 32, 33 are provided to in-series connected 3 unit inverter cells 4U1~4U3, 4V1~4V2, 4W1~4W3 of each phase.

Each of the transformers 31~33 has 3 sets of π/3n out of phase three-phase windings 31A, 32S, 33S at the secondary side and the unit inverter cells 4U1–4U3, 4V1–4V3, 4W1–4W3 at the n-th stage of eac phase are connected with the out of phase secondary windings 31S–33S at each phase.

3 input transformers (31, 32, 33) are provided for n (3) in series connected unit inverter cells, each transformer has 3 sets of π/(3×3) out of phase three-windings at the secondary side and out of phase secondary windings are connected to the unit inverter cells at the n-th stage of each phase. Thus, when the input transformers 31, 32, 33 are separated, the number of secondary windings are largely reduced less than when a system is manufactured with one transformer and therefore, there is such a merit that fluctuation of impedance between the windings can be suppressed to a lower level. So, harmonic component of input current is no longer fluctuated largely between phases.

Fourth Embodiment

Figure 9:
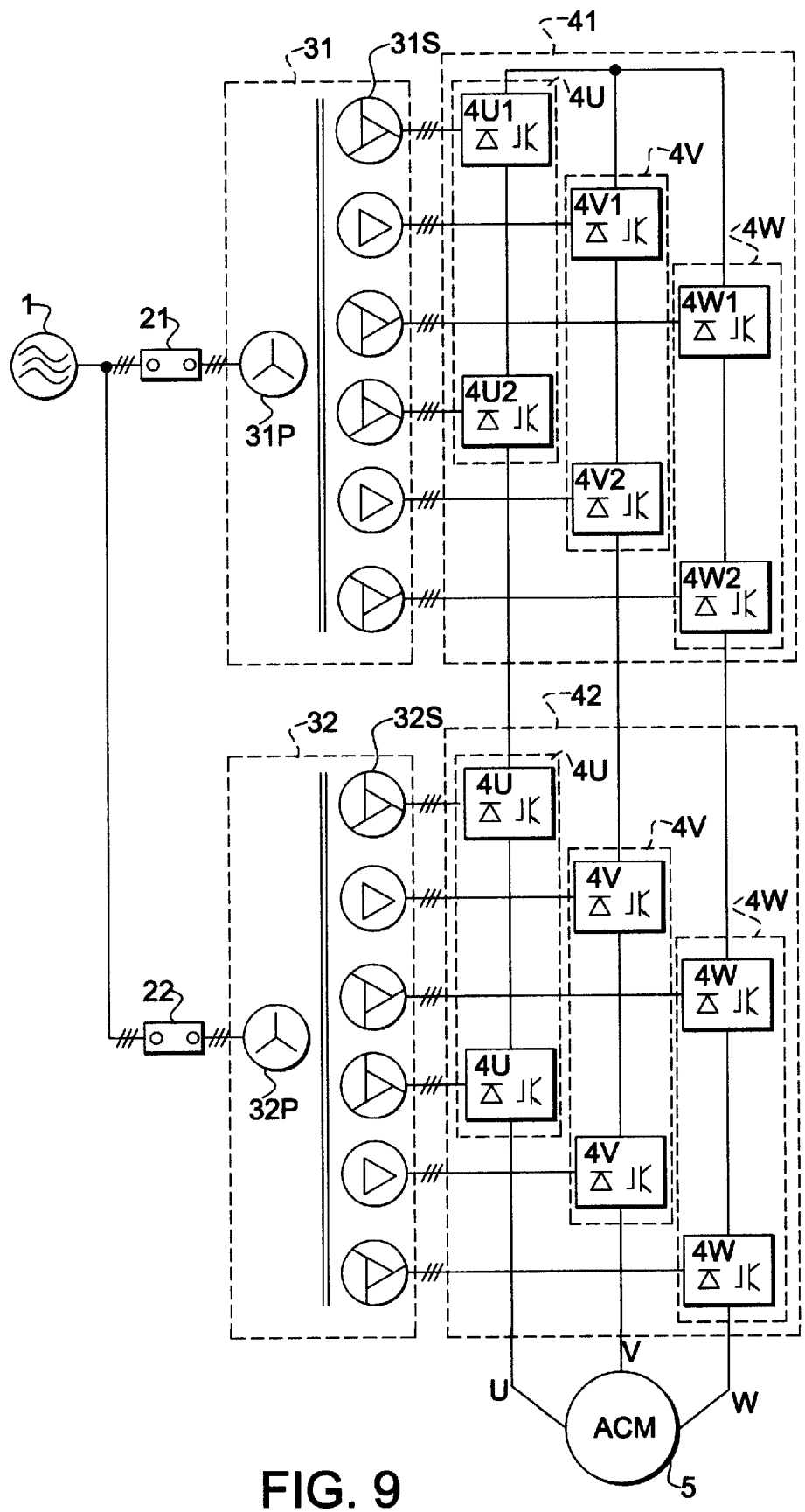
FIG. 9. is a circuit diagram for explaining a fourth embodiment of a multiple inverter system of the present invention.

FIG. 9 shows the fourth embodiment of the present invention. In this embodiment, m units of input transformer are provided and the secondary winding of each transformer has 3n sets of three-phase windings. The unit inverters 4U1~4U2, 4U, 4V1~4V2, 4V, 4W1~4W2, 4W at the n-th stage of each phase are connected with secondary windings which are out of phase in each phase.

In the embodiment shown in FIG. 9, two transformers 31, 32 are in the entirely same winding construction but the primary windings 31P, 32P may be made in the star connection and the delta connection.

Fifth Embodiment

Figure 10:
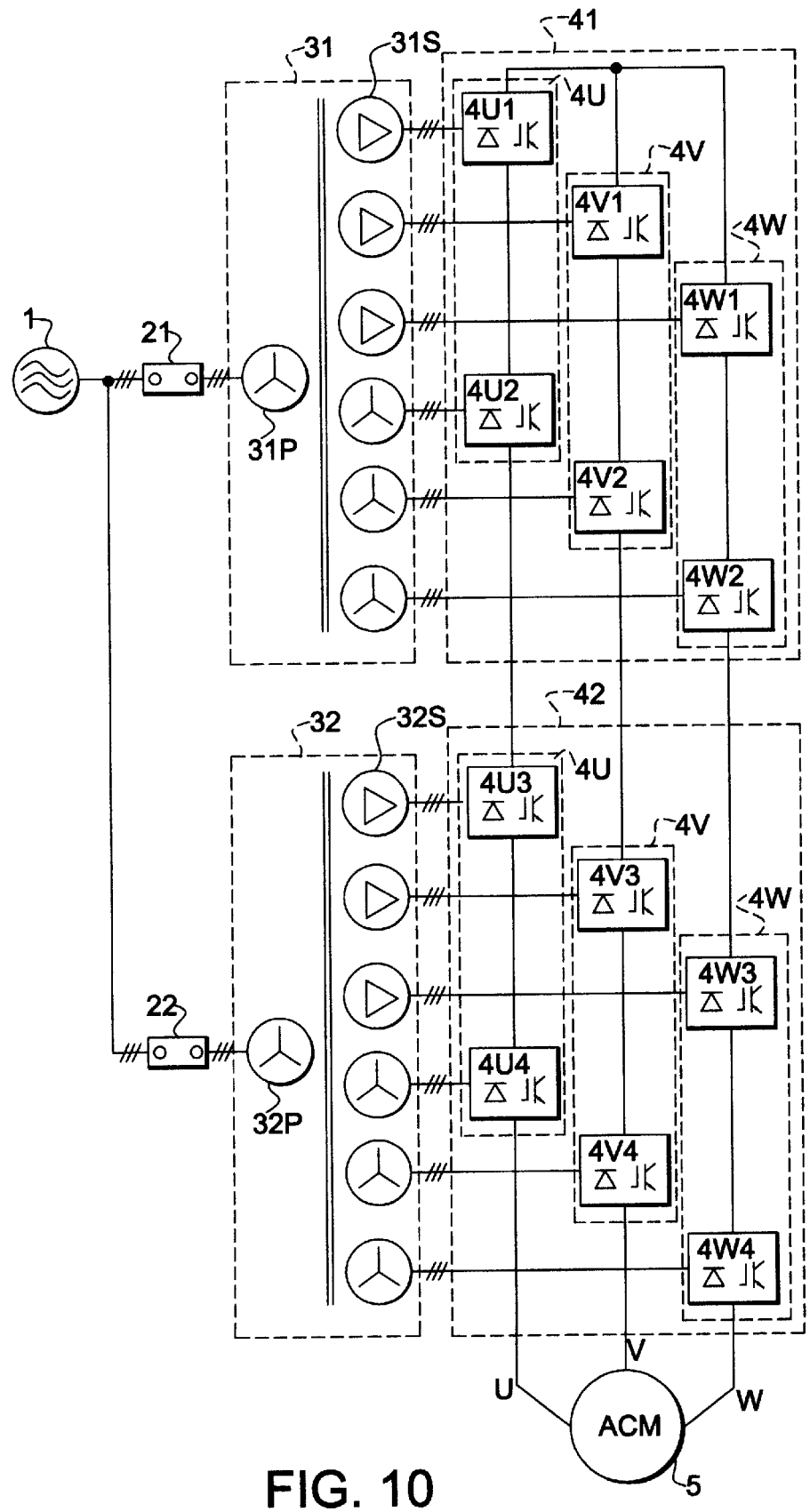
FIG. 10 is a circuit diarram for exlaining a fifth embodiment of a multiple inverter of the present invention.

FIG. 10 shows the fifth embodiment of the present invention and the unit inverter cells at the n-th stage of each phase are connected with the secondary windings 31S, 32S of the same phase input transformers.

Figure 11:
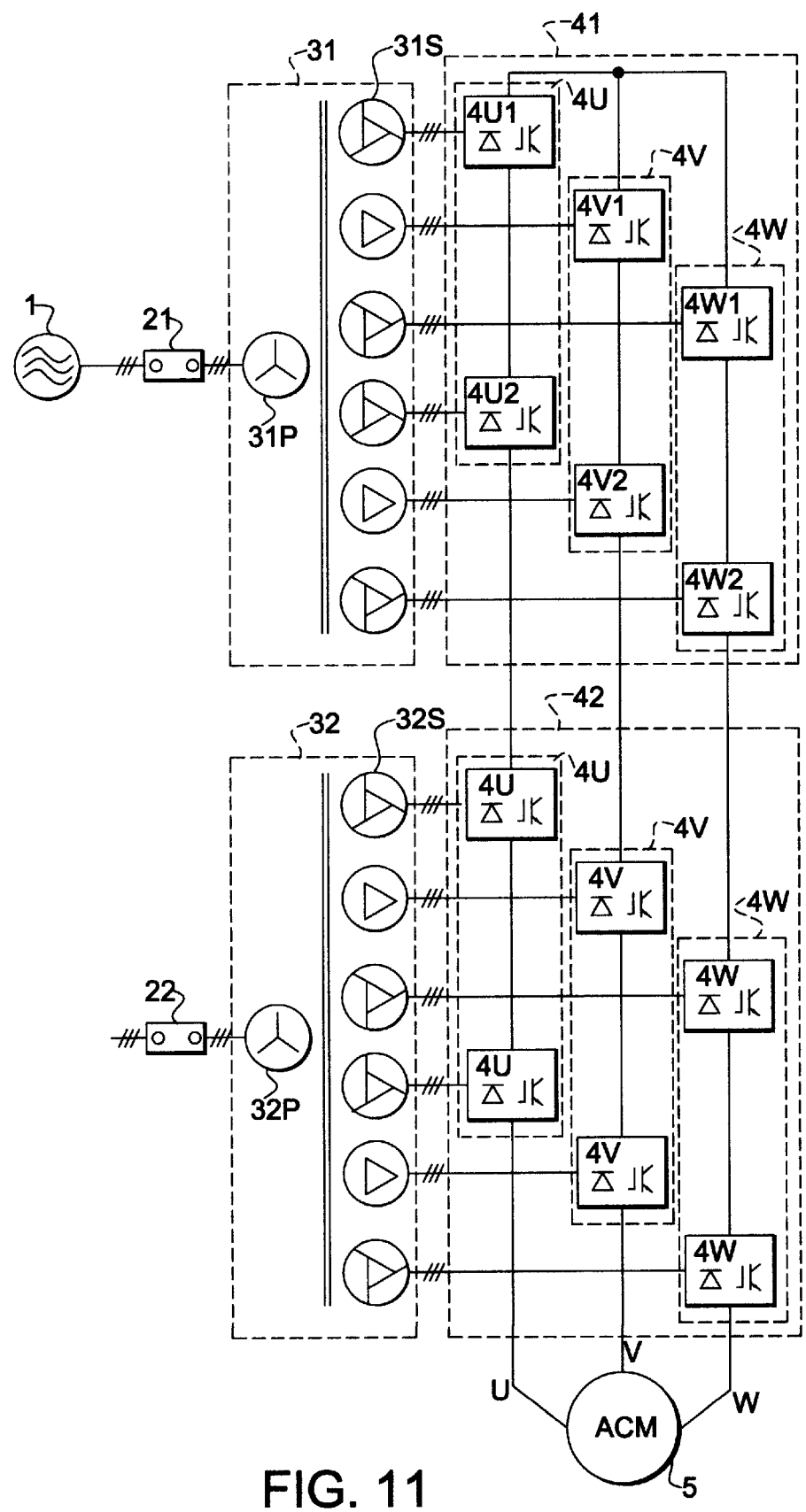
FIG. 11 is a circuit for explaining a sixth embodiment of a multiple inverter system of the present invention.

In the embodiments shown in FIG. 9 and FIG. 10, the design and manufacturing can be simplified by reserving 2 sets for two stages of each phase. In case of the circuit shown in FIG. 7, the circuit can be simplified when it is constructed with 3 sets by setting with a transformer for one stage of each phase Sixth Embodiment FIG. 11 shows the sixth embodiment of the present invention, characterized in that the the phase of windings of the primay sides 31P, 32P of the input transformers 31, 32 are shifted by the star and delta connections so as to make them in the 12 phase structure, the secondary sides have 3n sets of three-phase windings, respectively and the secondary windigs of which phases are shifted for each phase are connected to the unit inverter cells 4U1~4U2, 4U, 4V1~4V1, 4V, 4W1~4W2, 4W. The primary windings of the transformers of course may be the same.

Seventh Embodiment

Figure 12:
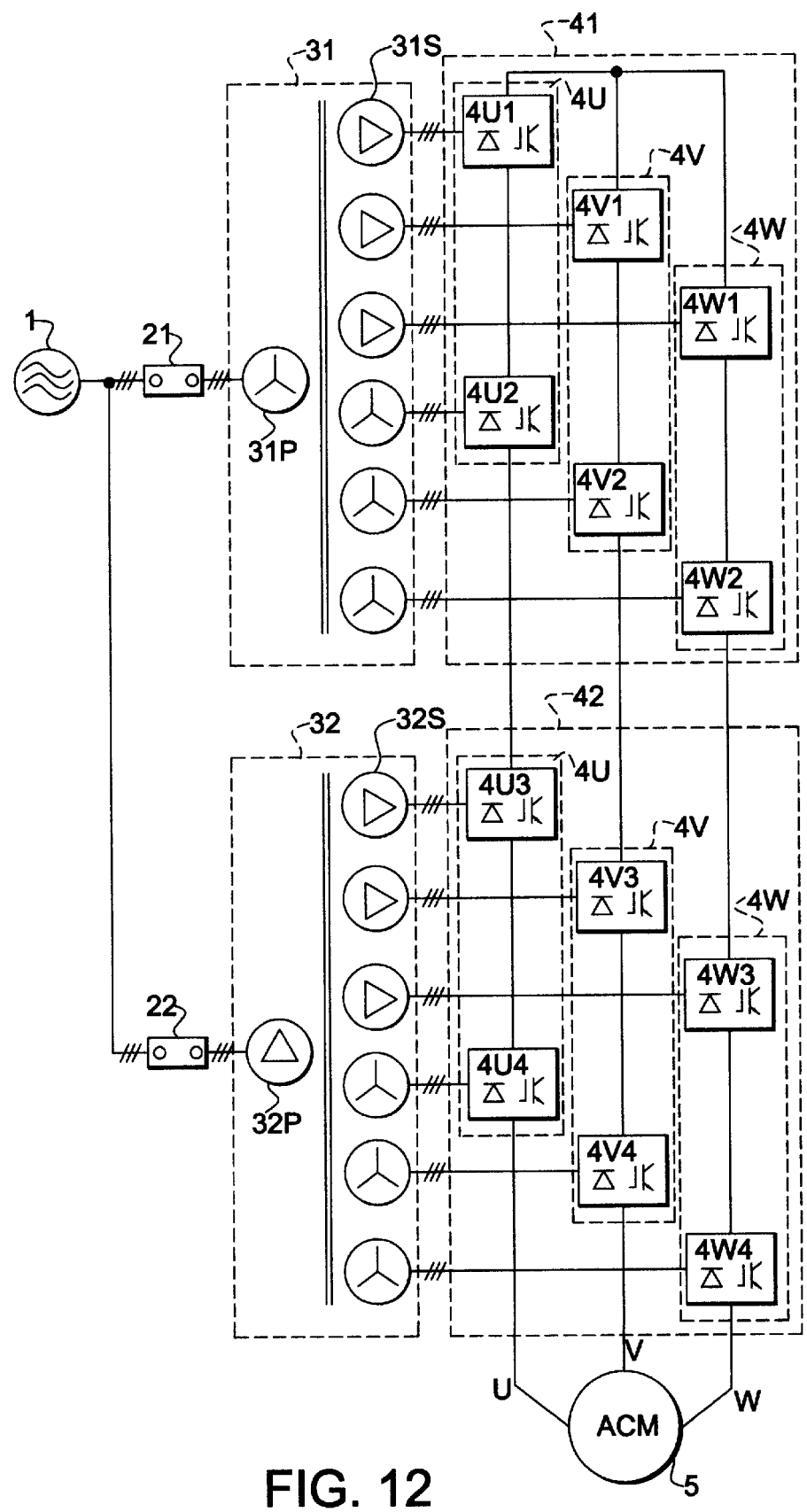
FIG. 12 is a circuit diagram for explaining a seventh embodiment of a multiple inverter system of the present invention.

FIG. 12 shows the seventh embodiment of the present invention and differs from FIG. 11 in that the system is constructed by connecting the secondary windings of the same phase at each phase to the unit inverter cells 4U1~4U4, 4V1~4V4, 4W1~4W4 at the n-th stage of each phase.

Eighth Embodiment

FIG. 13 is a signal waveform diagam. FIG. 13(a) shows the input current to the unit inverter cell when reactance of the transformer is nearly zero and FIG. 13(b) shows reactance of the transformer that is a proper value so that the current does not flow intermittently. Generally, it is easy to manufacture a transformer if % impedance is 10–20%.

The low order harmonic component of input current can be improved sharply when such care is paid.

Ninth Embodiment

FIG. 14 shows the ninth embodiment of the present invention. Switches 2c~2k that are able to cut off a circuit are provided at at least either the primary side or the secondary side three-phase windings of the input transformer 3 so as to be able to open the corresponding main power source if the unit inverters 4U1, 4U2a, 4U3a, 4V1, 4V2a, 4V3a, 4W1, 4W2a, 4W3a become faulty.

Tenth Embodiment

Figure 15:
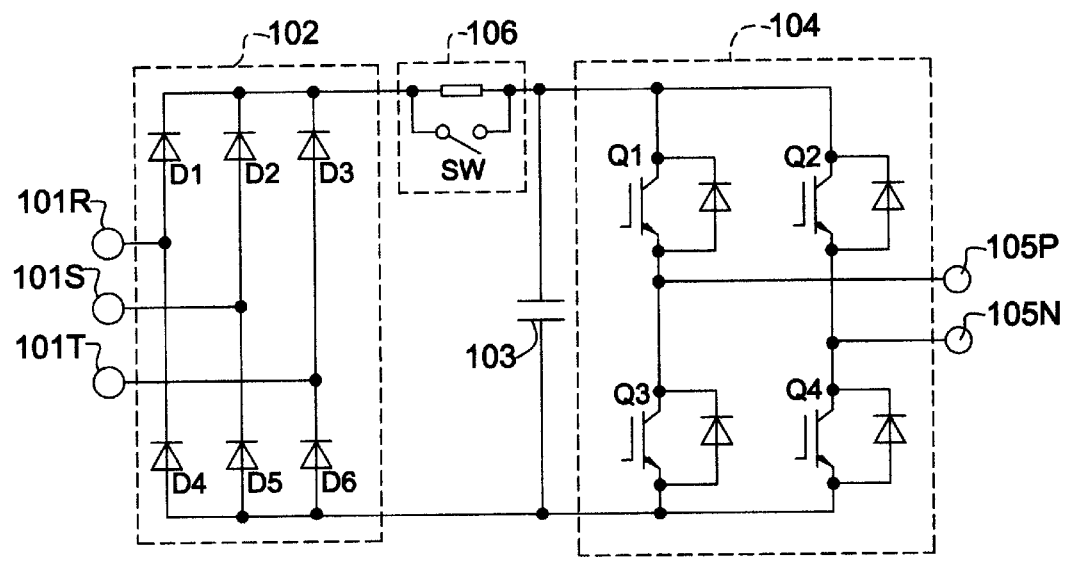
FIG. 15 is a circuit diagram of an inverter for explaining a tenth embodiment of a multiple inverter system of the present invention.

FIG. 15 shows the tenth embodiment of the present invention. The unit inverter cell comprises a diode rectifier 102 which converts AC into DC, a smoothing capacitor 103 and a single-phase inverter circuit 104 which converts DC into any frequency AC. When diodes are used for a rectifier, in order to prevent the rush current to the capacitor 103, the diodes should be initially charged for a specified time via a resistor R and thereafter, a switch SW should be turned ON. In this embodiment, such self-turn-off semiconductor devices as GTO, transistor, etc. are used for the single-phase circuit 104 and such a voltage driving type self-turn-off device as IGBT, etc. are used in the deformed embodiment.

Eleventh Embodiment

Figure 16:
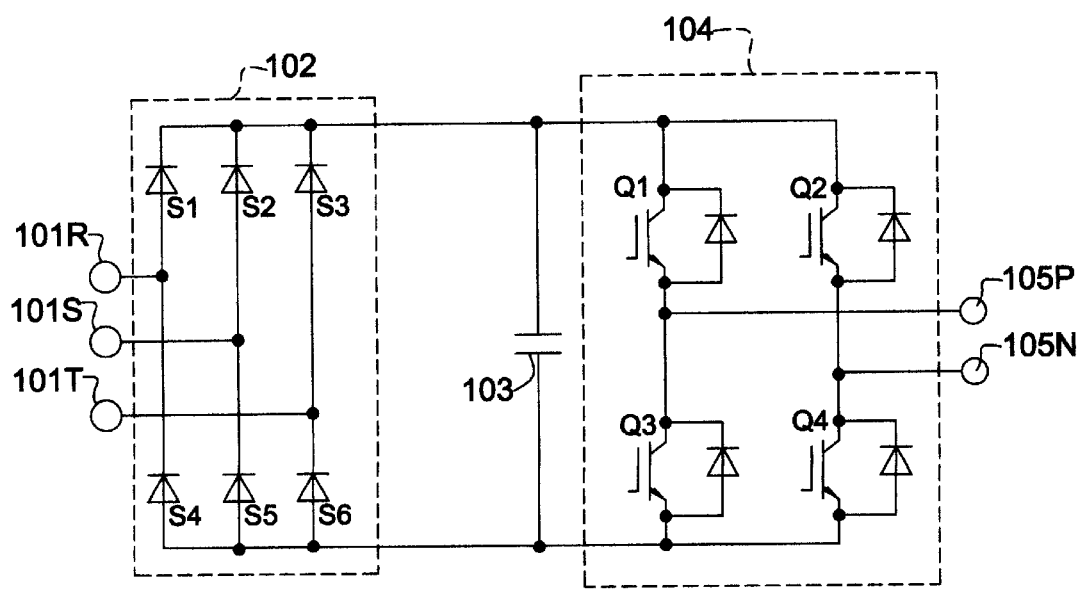
FIG. 16 is a circuit diagram of an inverter for explaining a eleventh embodiment of a multiple inverter system of the present invention.

FIG. 16 shows the eleventh embodiment of the present invention and a semiconductor device with a gate control pole such as thyristor, GTO, etc. are used for the rectifier 102 which converts AC into DC. In this case, a circuit 106 which initially charges the DC capacitor 103 shown in FIG. 14 can be omitted.

Twelfth Embodiment

Figure 17:
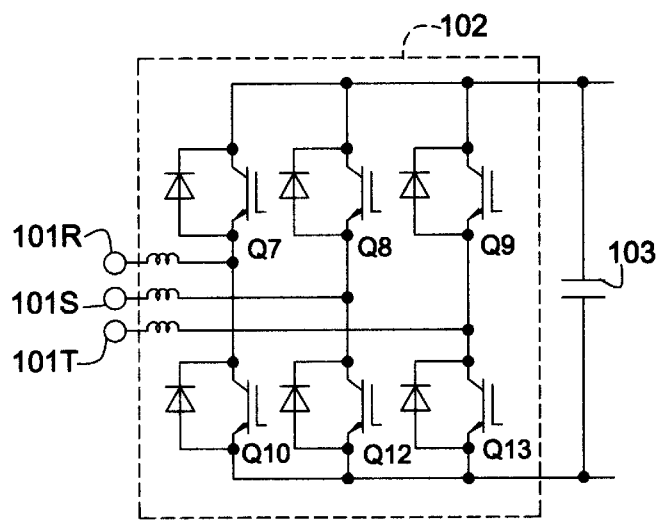
FIG. 17 is a circuit diagram of an inverter for explaining a twelfth embodiment of a multiple inverter system of the present invention.

FIG. 17 shows the twelfth embodiment of the present invention. The rectifier in at least one unit inverter cell comprises a self-turn-off semiconductor device with a gate control pole (IGBT, GTO, etc.) and it becomes possible to make not only the the power factor 1 control (pf=1.0) but also particularly the leading control by the PWM control. In FIG. 17, an example of reactor provided to the input portion is shown to reduce current harmonic. It is also possible to use the reactance of the input transformer as a reactor without providing a reactor as described above.

Thirteenth Embodiment

Figures 18, 19:
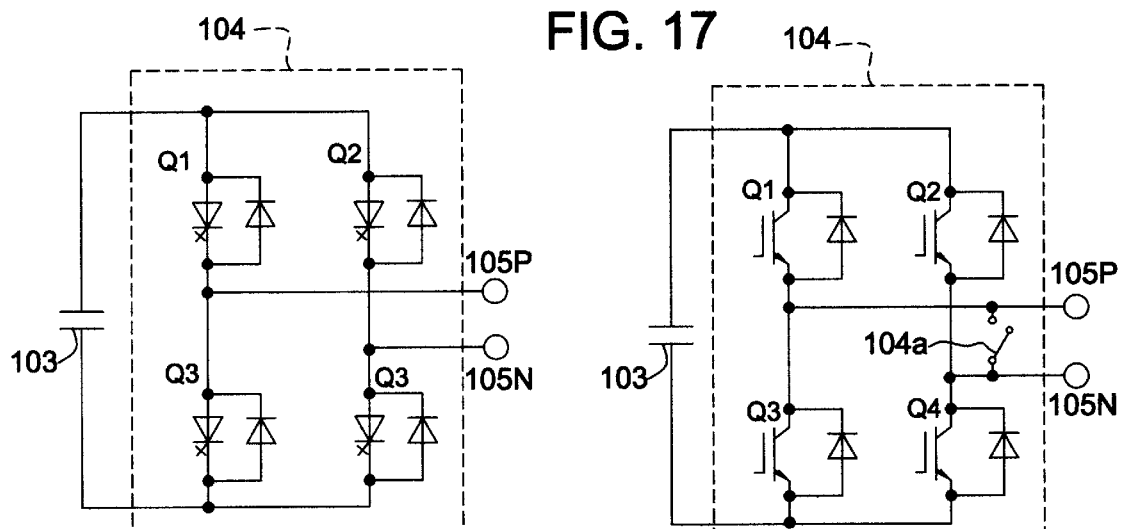
FIG. 18 is a circuit diagram of an inverter for explaining a thirteenth embodiment of a multiple inverter system of the present invention.
FIG. 19 is a circuit diagram of a inverter for explaining a fourteenth embodiment of a multiple inverter system of the present invention.

FIG. 18 shows the thirteenth embodiment of the present invention, wherein a current driving self-turn-off semiconductor devices such as GTO are used for the devices of the inverter circuit 104.

Fourteenth Embodiment

FIG. 19 shows the fourteenth embodiment of the present invention, wherein voltage driving self-turn-off semiconductor devices Q1~Q4 such as IGBT, etc. are used for the devices of the inverter circuit 104. Further, FIG. 19 shows its deformed example and the output portion of the inverter circuit of the unit inverter cell is provided with a switch 104a to bypass its output.

Fifteenth Embodiment

Figure 20A:
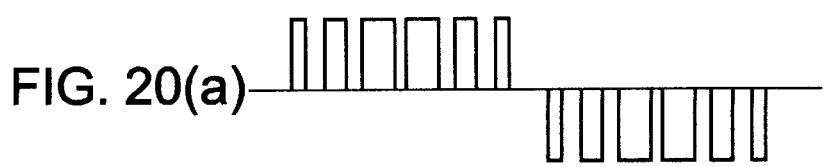
FIG. 20 is a signal waveform diagram for explaining a fourteenth embodiment of a mult-inverter system of the present invention.
Figure 21A:
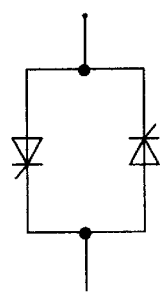
FIG. 21 is a circuit diagram of an inverter for explaining a fifteenth embodiment of a multiple inverter system of the present invention.
Figure 21B:
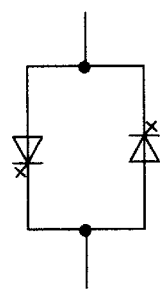
Figure 21C:
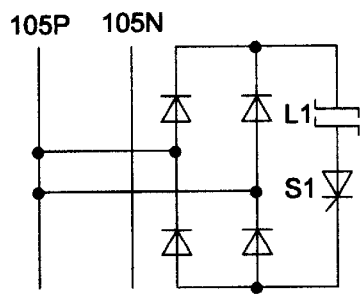
Figure 21D:
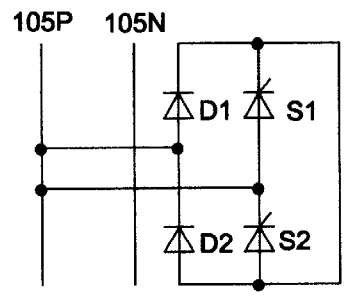

FIGS. 20(a) and (b) show the output waveforms in this embodiment and at least one of the inverter circuits of a plurality of unit inverter cells controls the output voltage through the PWM control while the other remaining unit inverters control the output voltage through the PAM control Sixteenth Embodiment FIG. 21 shows the sixteenth embodiment and FIG. 21(a) shows thyristors that are connected antiparallelly, FIG. 21(b) shows self-turn-off devices such as GTO, etc. connected antiparallelly and FIG. 21(c) shows bridge connected diodes as a rectifier and a semiconductor device with a short-circuit control pole S1 connected to its DC output, and a saturable reactor L1 is connected in series to this semiconductor device so as to check the current to rise. FIG. 21(d) shows diodes D1, D2 that are bridge connected using semiconductor devices with a control pole S1, S2 for use as a switch to bypass the output of the unit inverter cell so as to short circuit its DC output.

Seventeenth Embodiment

Figure 22:
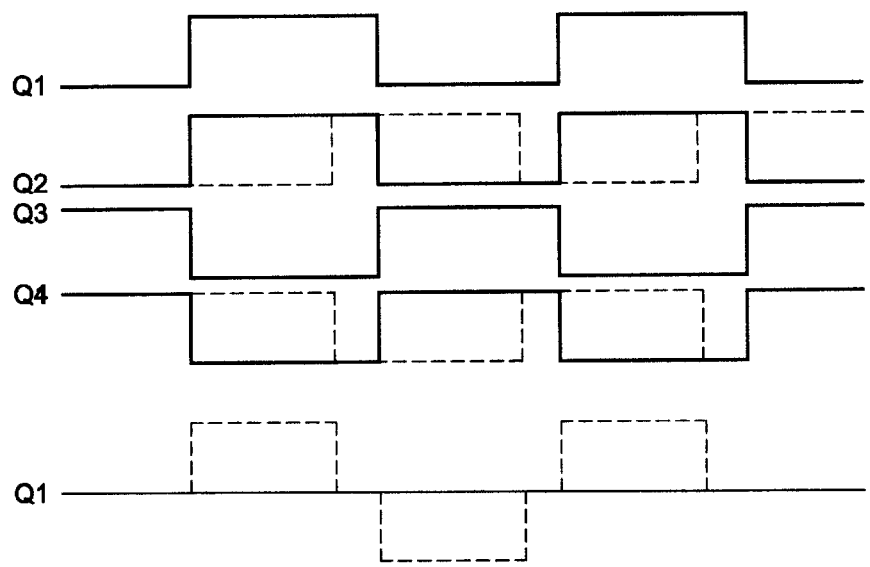
FIG. 22 is a signal waveform diagram for explaining a sixteenth embodiment of a multiple inverter system of the present invention.

FIG. 22 shows the seventeeth embodiment and gate signal phases to the inverter circuit (Q1~Q4 shown in FIG. 14) of the unit inverter cells of U, V, W phases (4U3, 4V3, 4W3) at the third stage shown in FIG. 5. When such phase gate signals are given, the output voltage of the unit inverter bcomes zero and it is possible to obtain a low voltage as the output voltage of a multiple inverter system. The broken lines in FIG. 22 shows the operating waveform in the normal PAM operation.

Eighteenth Embodiment

On the other hand, in this embodiment, the output voltage is controlled to zero by short-circuitting the output of the unit inverter by operting the bypass circuit shown in FIG. 21. At this time, the gate signal to the devices of the inverter circuit of the unit inverter cell should be suspended.

Nineteenth Embodiment

Figure 23A:
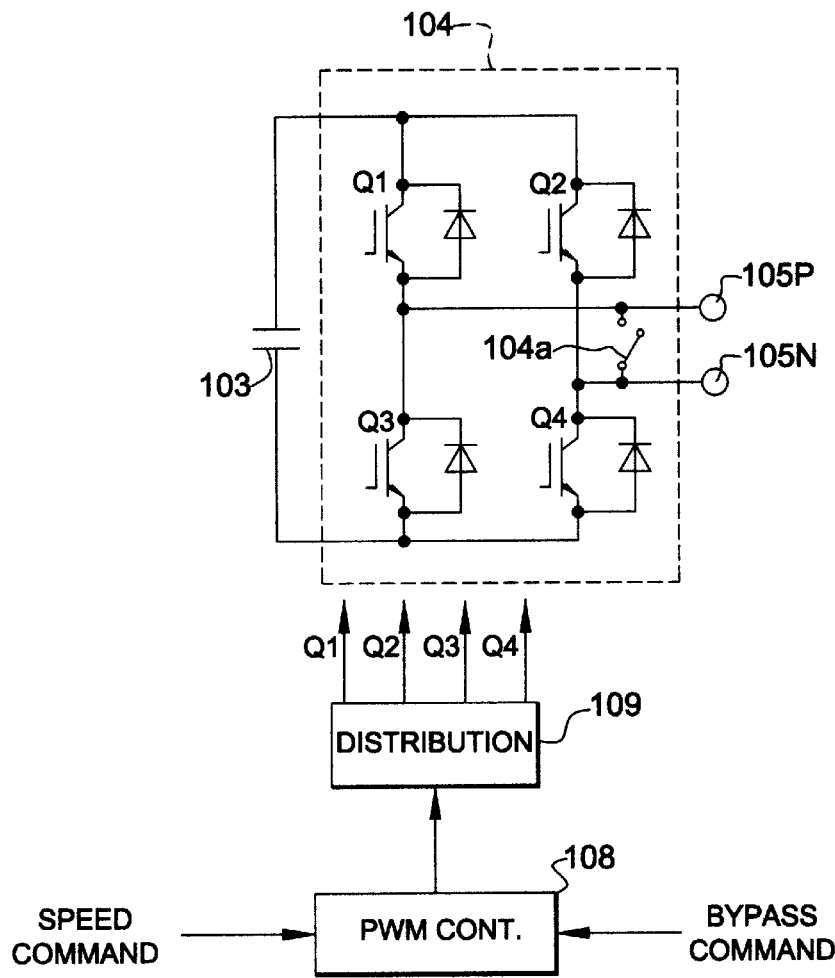
FIG. 23 is a diagram for explaining a seventeenth embodiment of a multiple inverter system of the present invention.
Figure 23B:
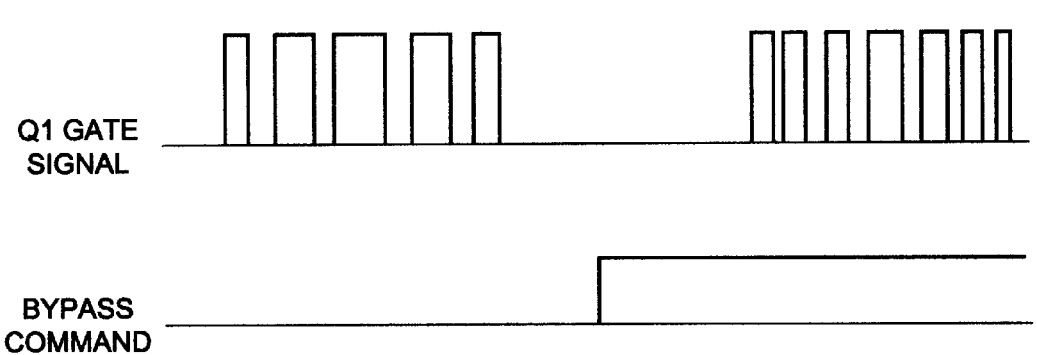

FIG. 23 shows the embodimen of the control method. When controlling the multiple inverter system, as the harmonic component of the output voltage may increase, it is possible to supply voltage to a load without increasing the harmonic component by increasing the PWM operating frequency (in the embodiment shown in FIG. 5, increase PWM freuqency by 1.5 times) at other stages in operation (other two stages in FIG. 5) Therefore, the PWM frequency of the unit inverter cell in operation should be changed by a bypass command signal or the output voltage zero command.

Twentieth Embodiment

Figure 24:
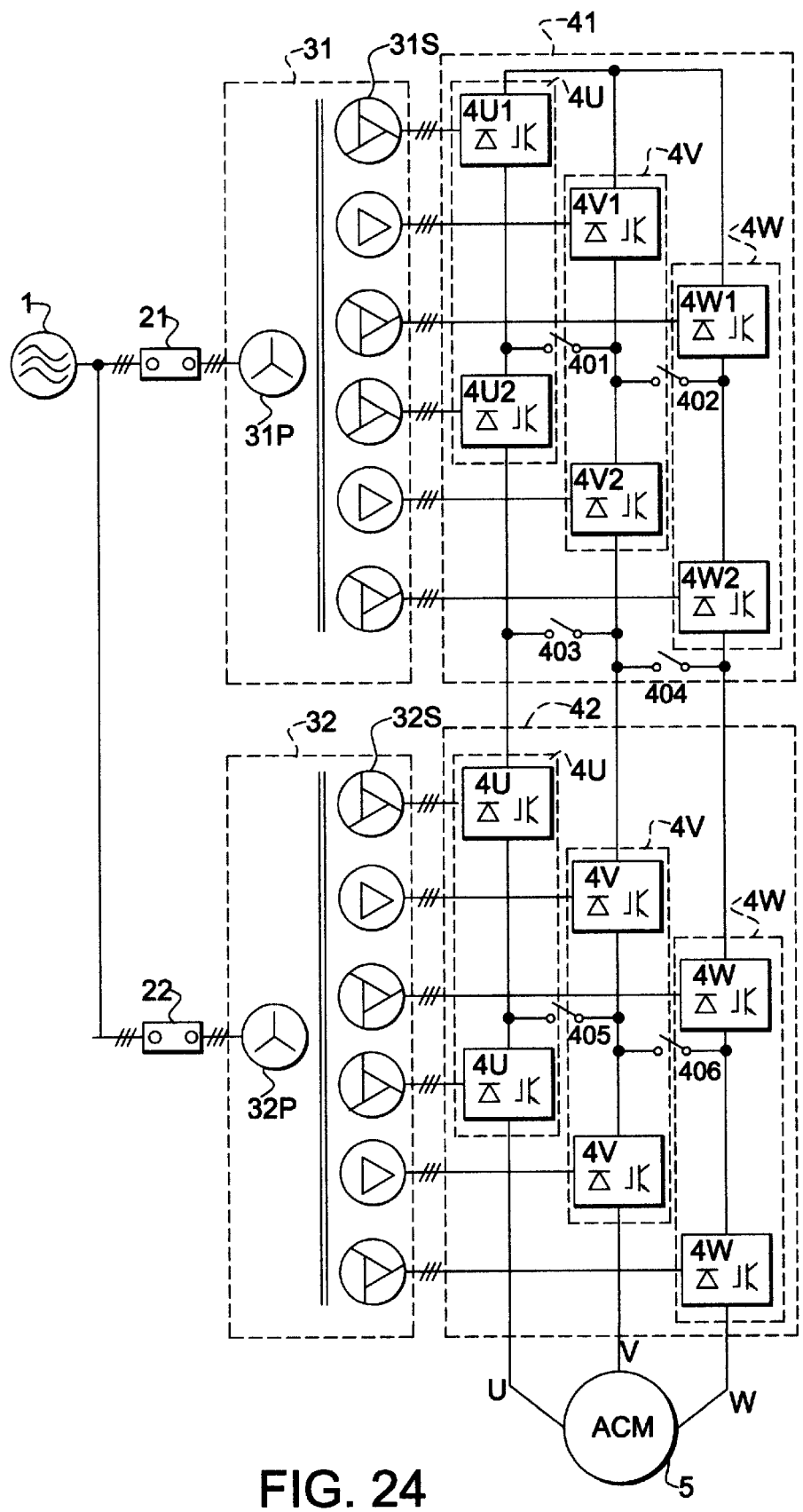
FIG. 24 is a circuit diagram for explaining a eighteenth embodiment of a multiple inverter system of the present invention.

FIG. 24 shows the twentieth embodiment of the present invention, wherein switches 401~406 capable of changing over the output voltage are provided between the unit inverter cells in respective phases of a multiple inverter system so as to be able to change supply voltage to a multiple phase load. High-voltage motors are generally 6 kV system and 3 kV system in Japan and 4.2 kV sysem and 2.4 kV system in U.S.A. and there are uses to change the systems according to loads.

Twenty-First Embodiment

Figure 25:
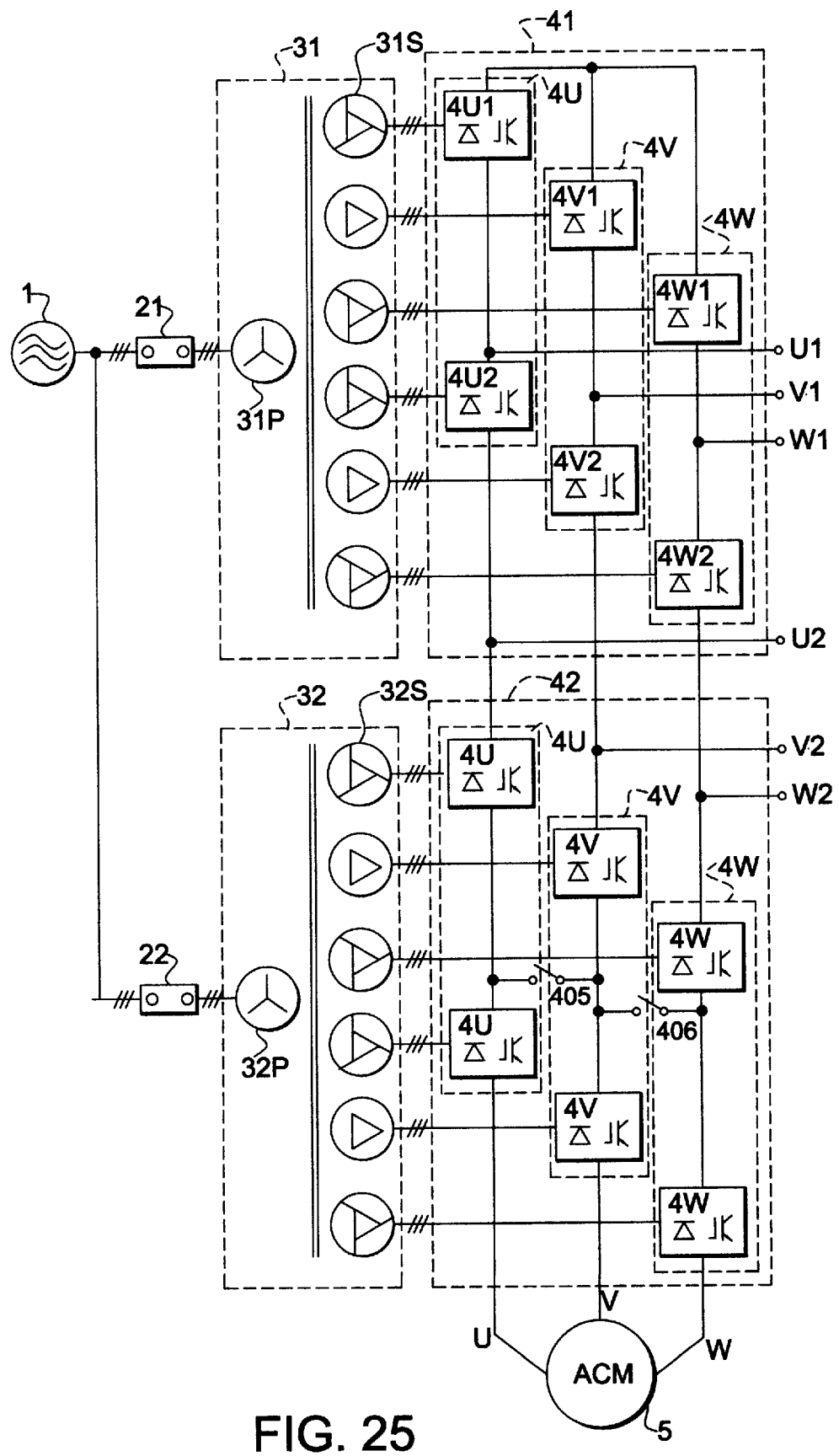
FIG. 25 is a circuit diagram for explaining a nineteenth embodiment of a multiple inverter system of the present invention.

FIG. 25 shows the twenty-first embodiment of the present invention, wherein the output terminals U1, V1, W1 and U2, V2, W2 are provided between the unit inverter cells in respective phases of a multi-inveter system so as to be able to change over supply voltage to a multiple phase load.

Twenty-Second Embodiment

FIG. 22 shows the twenty-second embodiment of the present invention, wherein a converter for the regeneration is connected to antiparallelly to a rectifier of the unit inverter cell at any stage of each phase. In a system wherein much power is regenerate from load, it is also easily considered to provide a regeneration circuit to all unit inverter cells so as to control the regeneration by any unit inverter cell according to regenerating volume of power. If a self-turn-off semiconductor device is used as a regeneration converter, it is easy to perform the PWM operation and it becomes possible to precisely control the regenerating power.

Twenty-Third Embodiment

Figure 27:
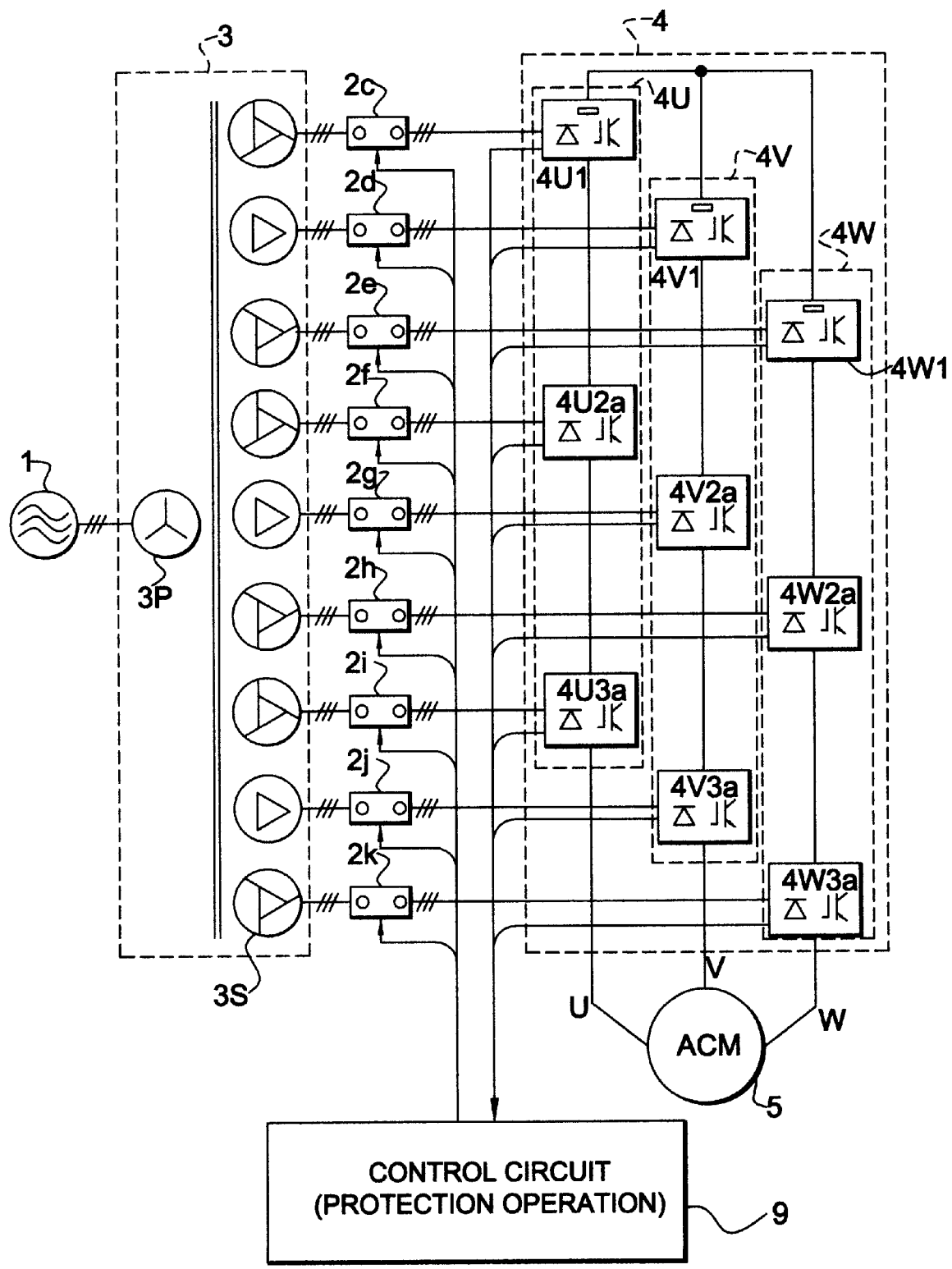
FIG. 27 is circuit diagram for explaining a twnty-first embodiment of a multiple inverter system of the present invention.

FIG. 27 shows the twenty-third embodimen of the present invention, wherein a fault detection and protective operation circuits of the unit inverter cells are provided, when the unit inverter cells 4U1~4W3 become faulty or during the maintenance, the switches 2c~2k provided to at least either the three-windings of the primary side or the secondary side of the input transformers corresponding to the unit inverters at the n-th stage equivalent to that unit inverter are controlled so as to open at lease more than one switch.

Twenty-Fourth Embodiment

Figure 20B:

The output voltage waveform of the twenty-fourth embodiment of the present invention is as shown in FIG. 20 and the control method of the multi-inventor system of the present invention is in such a structure that at least one of the unit inverter cells controls its output voltage through the PAM control and other unit inverter cells control the output voltage through the PWM control and voltages in respective phases are serially combined and the power is supplied to a multiple phase load.

Twenty-Fifth Embodiment

The control method of the multiple inverter system in this embodiment is in such a structure that the three-phase inverter cells control the output voltage through the PAM control while other unit inverter cells control the output voltage through the PWM control and respective phase voltages are serially combined and the power is supplied to a multiple phase load.

Twenty-Sixth Embodiment

FIG. 28 shows the PWM control of U-phase on the basis of the circuit shown in FIG. 5 and the output fundamental wave phases of the unit inverter cells in respective phases are controlled by shifig them by $\pi/3n$ and also, controlled so that the PWM switching phase at the same phase stage do not superpose each other. Needless to say, V and W phases are the waveforms of which phases are shifted from the waveforms shown in FIG. 28 by 120°.

Twenty-Seventh Embodiment

This embodiment relates to the control of the multiple inverter system of the present invention when starting it as shown in FIG. 29, the system is so controlled that some unit inverter cell is given with a function to control the current value through the PWM control and when starting the multiple inverter system, this function is operated to supply current to the unit inverter cells in respective phases and after charged the inverter cells to a preset DC voltage value, the AC power source is turned ON and the system is operated.

In FIG. 29, the rotational speed of a motor 268 is detected by a rotation detector 269, the detected speed is fed back and the inverter frequency is so controlled that it becomes the slip frequency according to a torque command.

A current control loop (a current control amplifier 266) is provided in many cases. As the slip frequency and current are jointly controlled at this time, the stability is satisfactory and the system is endurable to the sudden acceleration/decelleration or load fluctuation. Further, as the detected speed is fed back, accuracy of the rotational speed is improved.

FIG. 29 is a circuit diagram showing what is described above and the output of the speed control amplifier 266 is converted into slip frequency and current commands which are then converted into the invrter frequency f, a frequency command and a motor primary terminal voltage V1 command through respective loops. There is provided a PWM control circuit for the control subsequent to a frequency command and a motor primary terminal voltage V1.

Further, a power regeneration additional circuit is used for the power rectifier as sudden acceleration/deceleration is performed. This system is used for a independent operation as it is required to perform the closed loop control, and it is possible to generate maximum torque irrespective of constant output characteristic, direct winding characteristic and rotational speed. This circuit comprises a speed setter 260, a comparator 261, a speed control amplifier 262, a current pattern generator 263, a current detector 264, a comparator 265, a current control amplifier 266, a PWM control circuit 267, a slip frequency pattern generator 271, a comparator 272 and a speed detector 270.

Twenty-Eighth Embodiment

FIG. 30 shows a diagram of the multiple inverter system viewed from just the above, showing the twenty-eighth embodiment of the present invention and when m-units of input transformers are provided, 3n units of the unit inverters are divided into 3n/m, each of which is combined with one input transformer to one set and m sets are arranged. That is, by combining an input transformer 31 and a converter 41 into one set as illustrated, the economical effect in designing and manufacturing can be expected from the same design. Further, as the dielectric strength also can be reduced when they are separated, the downsizing of the system becomes possible. If there are the even number of input transformers, there are such methods as shown in FIG. 30; a method to arrange two units back to back as in (a), a method to arrange two units facing each other as in (b) and a method to arrange two units bisymmetrically from the center as in (c) and other methods are also considered according to purpose such as arrangement, maintenance, improvement of workability.

Twenty-Ninth Embodiment

Figure 31:
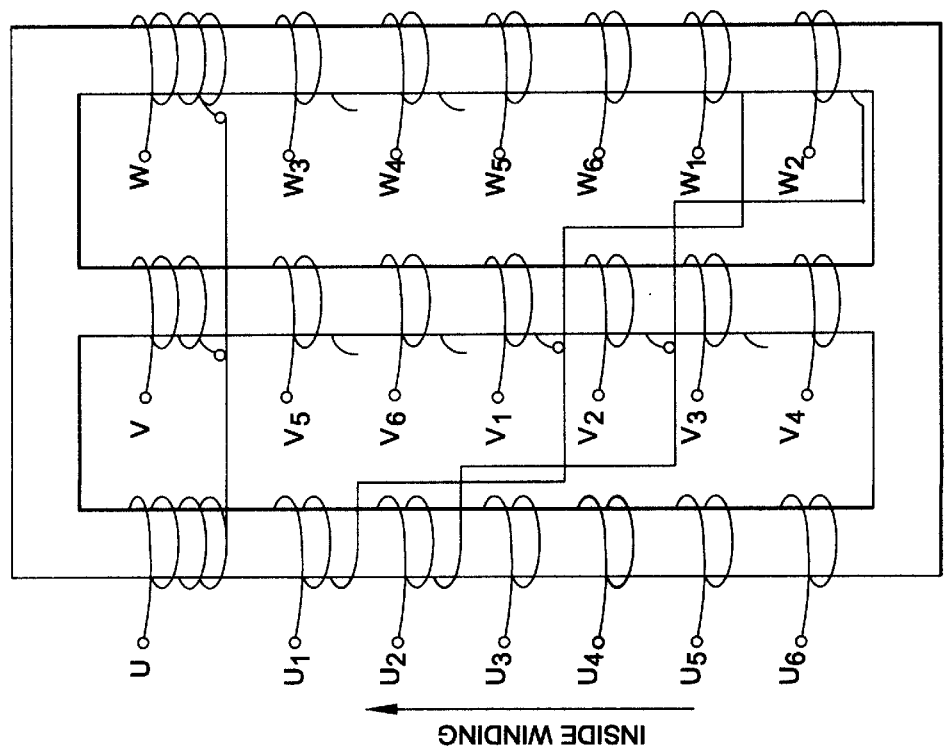
FIG. 31 is a schematic diagram of the transformer for explaining a twenty-fifth embodiment of a multiple inverter system of the present invention.

FIG. 31 shows the twnety-ninth embodiment of the present invention. In this embodiment, as the % impedances of the three-phase secondary windings of 3n sets are made uniform when comprising secondary windings of transformers, the windings in respective phases wound at different locations of a three-phase core are connected in three phases. Degree of connection of windings of a transformer generally differs at its inside and outside and therefore, impedance also varies. In FIG. 31, the three-phase connection is normally made at the same locations of u1, v5 and w3 but when three-phase windings are connected from the locations shown in this figure, it is possible to make % impedances of transformers uniform, input current of unit inverter cells can be made equal and phase currents and harmonic components at the power source side can be balanced.

Next, the thirtieth embodiment will be described.

Thirtieth Embodiment

Figure 32:
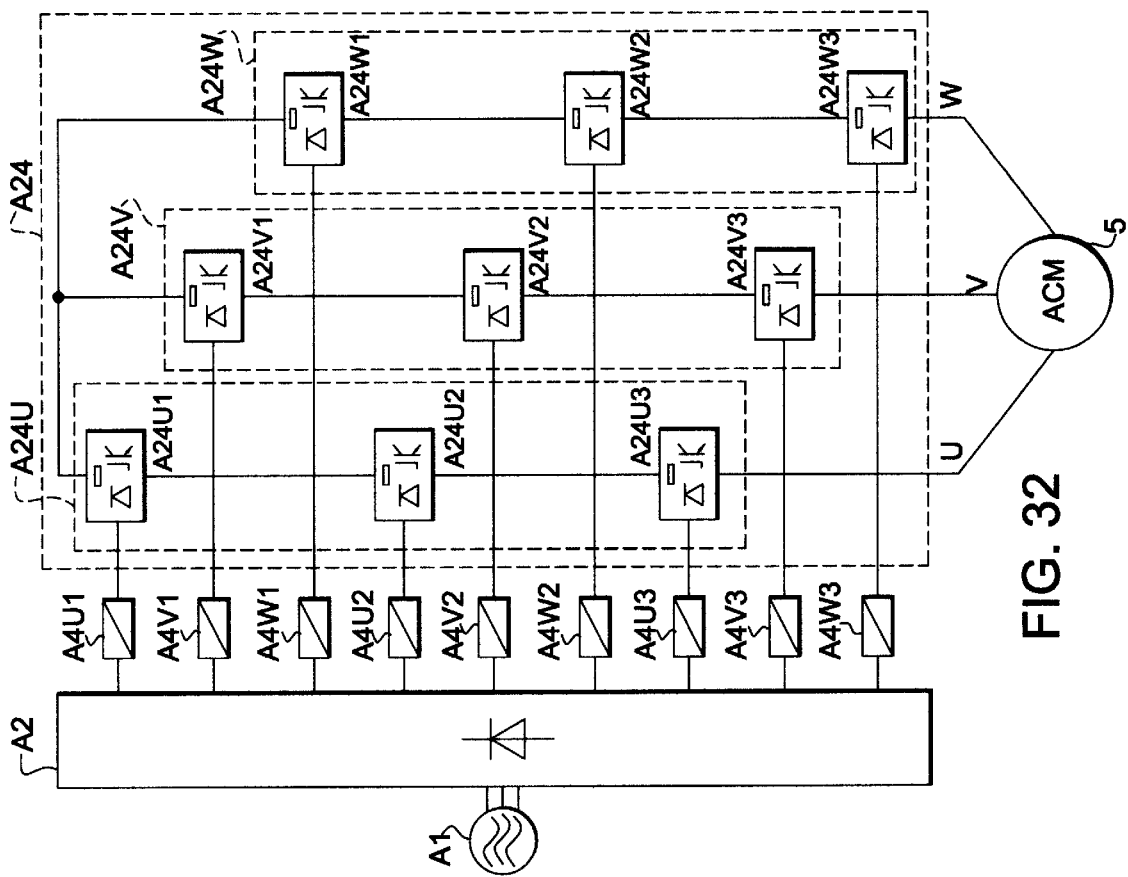
FIG. 32 is a circuit diagram showing a main cicuit of a multiple type inverter to which the present invention is applied.

FIG. 32 shows a main circuit of a multi-inverters (a group of inverters) to be applied with the present invention, wherein 3 units of U, V and W unit inverters in three-phase structure are connected; that is, A24U1, A24U2 and A24U3, A24V1, A24V2 and A24V3, and A24W1, A24W2 and A24W3. Definitely, fuses A4U1, A4U2 and A4U3, A4V1, A4V2 and A4V3, and A4W1, A4W2 and A4W3 are connected in series to the iuput sides of the unit inverters A24U1, A24U2 and A24U3, A24V1, A24V2 and A24V3, and A24W1, A24W2 and A24W3, respectively and connected to a rectifier 2 in parallel with it, and the output sides of the unit inverters are connected in series for each phase and connected to a AC load 10, for instance, an induction motor.

Figure 33:
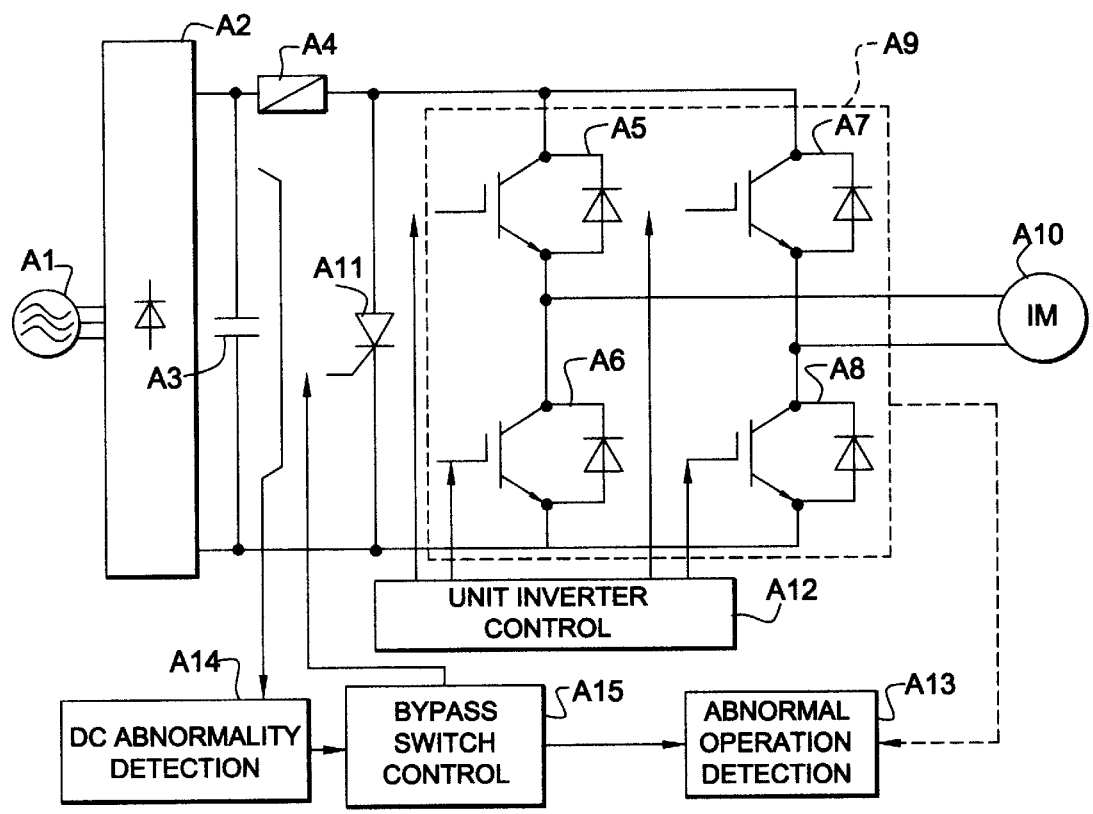
FIG. 33 is a circuit diagram showing essential portions only for explaining a thirtieth embodiment of a multiple inverter system of the present invention.

FIG. 33 is a block diagram for explaining the thirtieth embodiment, wherein a bypass circuit only comprising one unit inverter A9 out of a group of inverters (a mutiple inverters) shown in FIG. 32, a unit inverter control means A12 to control the firing of semiconductor devices A5, A6, A7, A8 of the unit inverter A9, a bypass switch A11, which is described later, an abnormal operation detecting means A13, a DC abnormality detecting means A14, and a bypass switch control means A15 is shown. In actual configuration, there are a plurlaity of unit inverters A9 and this bypass circuit is provided to each unit inverter A9.

Figure 34:
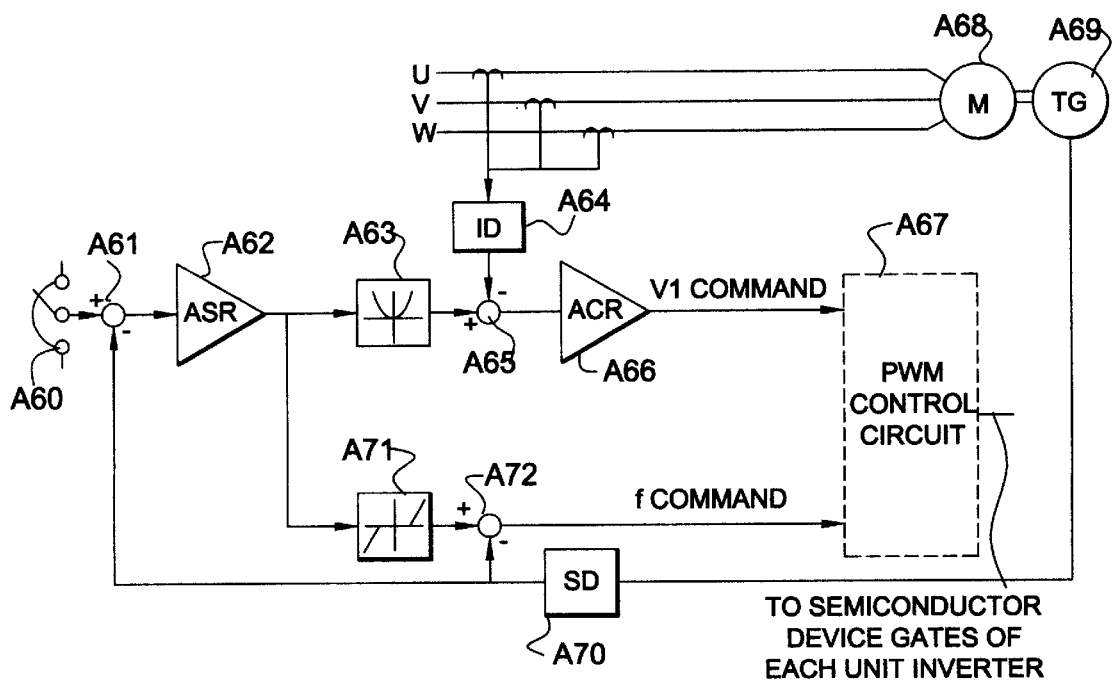
FIG. 34 is a diagram for explaining one example of a unit inverter control means shown in FIG. 33.

FIG. 34 is a diagram for explaining one example of the unit inverter control means A12, which feeds back the rotational speed of an AC motor A68 by detecting it and controls the inverter frequency so as to make it to the slip frequency corresponding to a torque command, and is also provided with a current control loop. Concretely, the rotational speed of the AC motor A68 is detected by a rotatio n detector A69 and a speed detector A70, this detected speed value is compared with a set value of a speed setter A60 by a comparator A61, a deviation between them is amplified by a speed control amplifier A62 and the amplified value is converted into a specified frequency by a slip frequency pattern generator A71, the converted frequency is compared with a speed value detected by the speed detector A70 by a comparator A72 and an inverter frequency f command thus obtained is applied to a PWM control circuit A67.

The output of the speed control amplifier A62 is input to a current pattern generator A63, where it is converted into current, the converted current and the current detected by a current detecor A64 is compared by a comparator A65, a deviation obtained by this comparation is input to a current control amplifier A66 and a motor primary terminal voltage V1 command obtained here is given to a PWM control circuit A67. The PWM control circuit A67 gives a gate command corresponding to a ratio between the inverter frequency f command and the motor primary terminal voltage V1 command to the gate of each unit inverter.

In a multiple inverter system in the structure as described above, if all the unit inverters A9 are in the properly operable state, the semiconductor devices A5~A8 of the unit inverter A9 are fired and controlled and high voltage AC power is supplied to the AC load A10.

In this case, as each unit inverter A9 is in the normal state, the abnormality detecting sinal is not output from the abnormal operation detecting means A13 and also, the abnormality detecting signal is not output from the DC abnormality detecting means A14 at the rectifier A2 side and therefore, a circuit closing command is not applied to the bypass switch A11 from the bypass switch control means A15. So, the bypass switch A11 is kept in the OFF state.

In such the state where each unit inverter A9 is proper operating, if, for instance, the semiconductor devices A5, A8 of one unit inverter A9 is short-circuitted (however, the bonding wires in IGBT comprising the unitinverters are still left), such operations as shown below are carried out. In this case, as AC output current of the unit inverters A9 increases and/or AC output voltage drops, the abnormal operation detecting means A13 outputs a abnormal detecting signal, which is then applied to the byass switch control means A15.

On the other hand, as DC input current to the inverter bridge A9 increases, an abnormality detection signal is output from the DC abnormality detection means A14 and given to the bypass switch control means A15. As a result, a circuit close command, that is, a gate ON signal is given to the bypass switch A11 from the bypass switch control means A15. As the bypass switch A11 is then turned ON, the short-circuit current so far flowing to the AC load A10 via the semiconductors A5, A8 flows through the course of the bypass switch A11, a fuse A4 and a smoothing capacitor A3, and the fuse A4 is burnt out. When the fuse A4 is burnt out, it becomes the output bypass mode automatically. As a result, the semiconductor devices of a healthy unit inverter A9 without generating short-circuit, fault, and the like are fired in the specified order and the power is supplied to the AC load A10, and the AC load A10 can be operated continuously.

Thus, it is not required to stop the operation of the multiple inverters once to protect AC load from excessive current resulting from the short-circuit trouble of unit inverters so far and an AC load A10 can be operated continuously by the healthy unit inverters A9.

Thirty-First Embodiment

Figure 35:
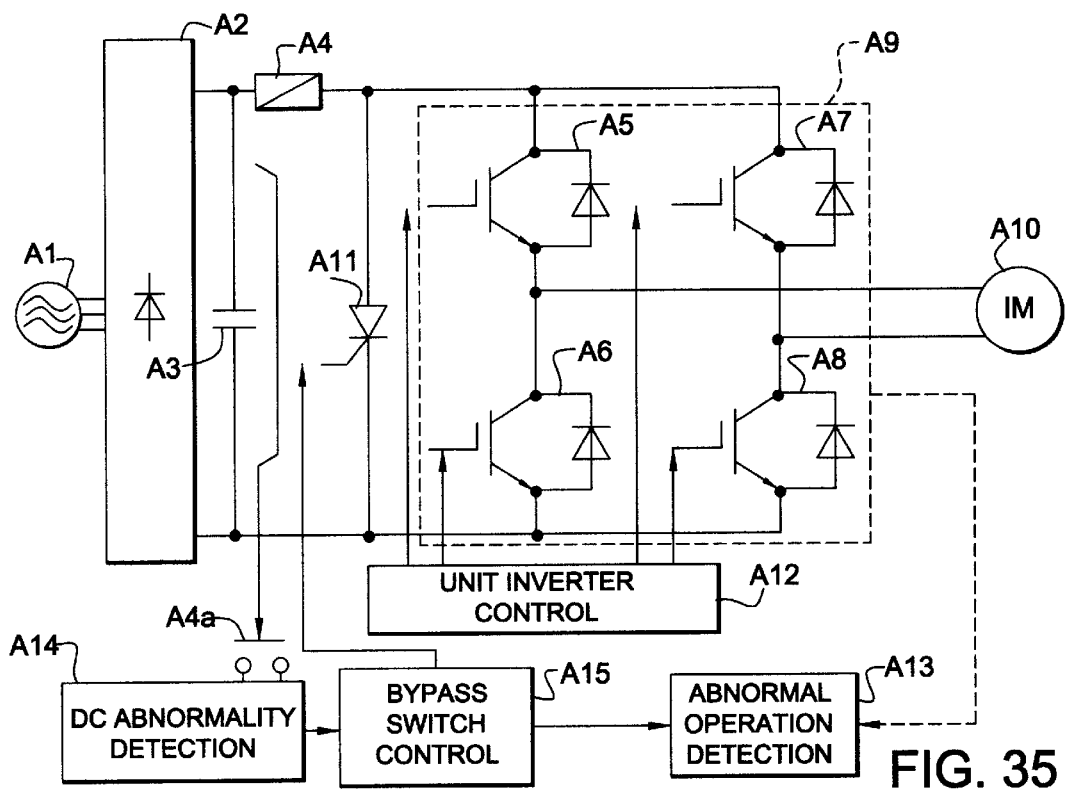
FIG. 35 is a circuit diagram showing essential portions only for explaining a thirty-first embodiment of a multiple inverter system of the present invention.

FIG. 35 is a bock diagram partially showing the thirty-first embodiment. In FIG. 35, likewise FIG. 32, one unit inverter A9, the unit inverter control means A12 which controls the firing of the semiconductor devices A5, A6, A7, A8 of the unit inverter A9, and a bypass circuit comprising the bypass switch A11, the abnormal operation detecting means A13, the DC abnormality detecting means A14 and the bypass switch control means A15, which will be described later, only are shown but in the actual configuration, there are a plurality of unit inveters A9 and each the unit inverters A9 are provided with above-mentioned bypass circuit, respectively.

FIG. 35 differs from FIG. 33 only in that an operating contact A4a which is closed with the burn-out of the fuse A4 is provided at the input side of the DC abnormality detecting means A14.

Thirty-Second Embodiment

Figure 36:
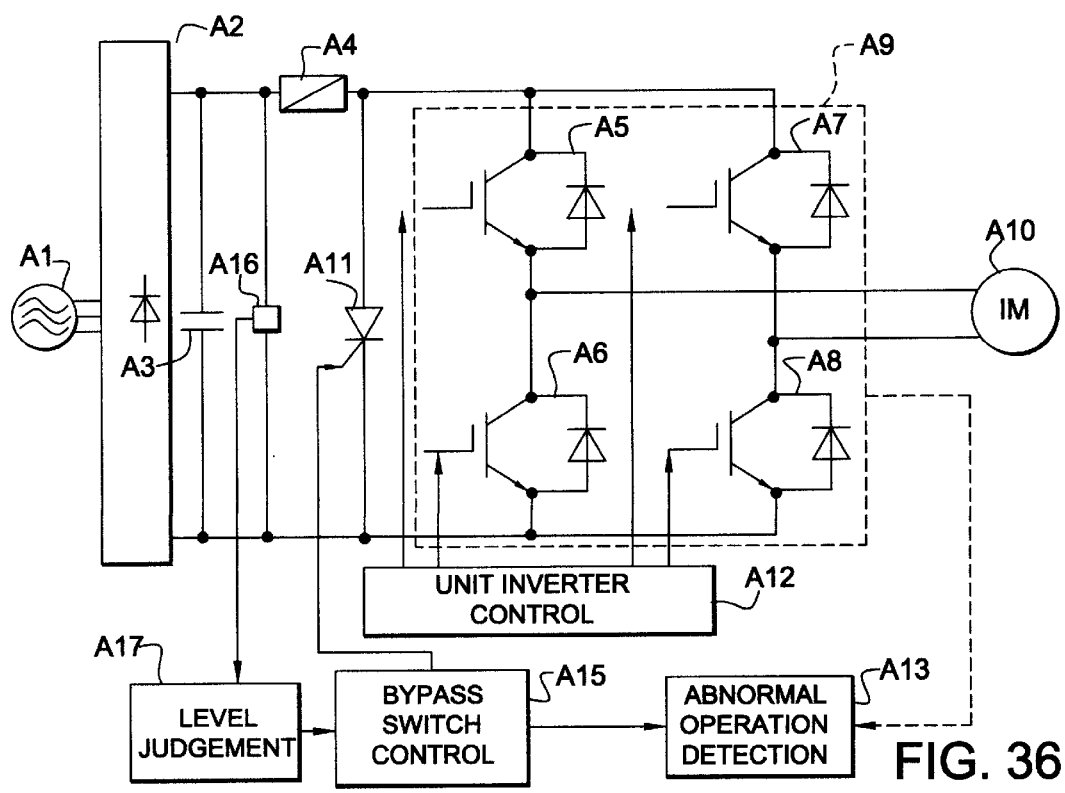
FIG. 36 is a circuit diagram showing essential portions only for explaining a thirty-second embodiment of a multiple inverter system of the present invention.

FIG. 36 is a block diagram partially showing the thirty-second embodiment. In FIG. 36, likewise FIG. 33, one unit inverter A9, the unit inverter control means A12 which controls the firing of the semiconductor devices A5, A6, A7, A8 of the unit inverter A9, and a bypass circuit comprising the bypass switch A11, the abnormal operation detecting means A13, a level juding means A17 and the bypass switch control means A15, which will be described later, only are shown but in the actual configuration there are a plurality of unit inveters A9 and each of the unit inverters A9 is provided with the above-mentioned bypass circuit, respectively.

DC voltage applied to the unit inverters A9 is detected by the voltage detecting means A16 and the level judging means A17 detects whether the DC voltage detected by the voltage detecting means A16 is the overvoltage or undervoltage against a reference value. When a judging signal is output from the level judging means A17 and a detecting signal is output from the abnormal operation detecting means A13, the bypass switch control means operates as in FIG. 33.

Thirty-Third Embodiment

Figure 37:
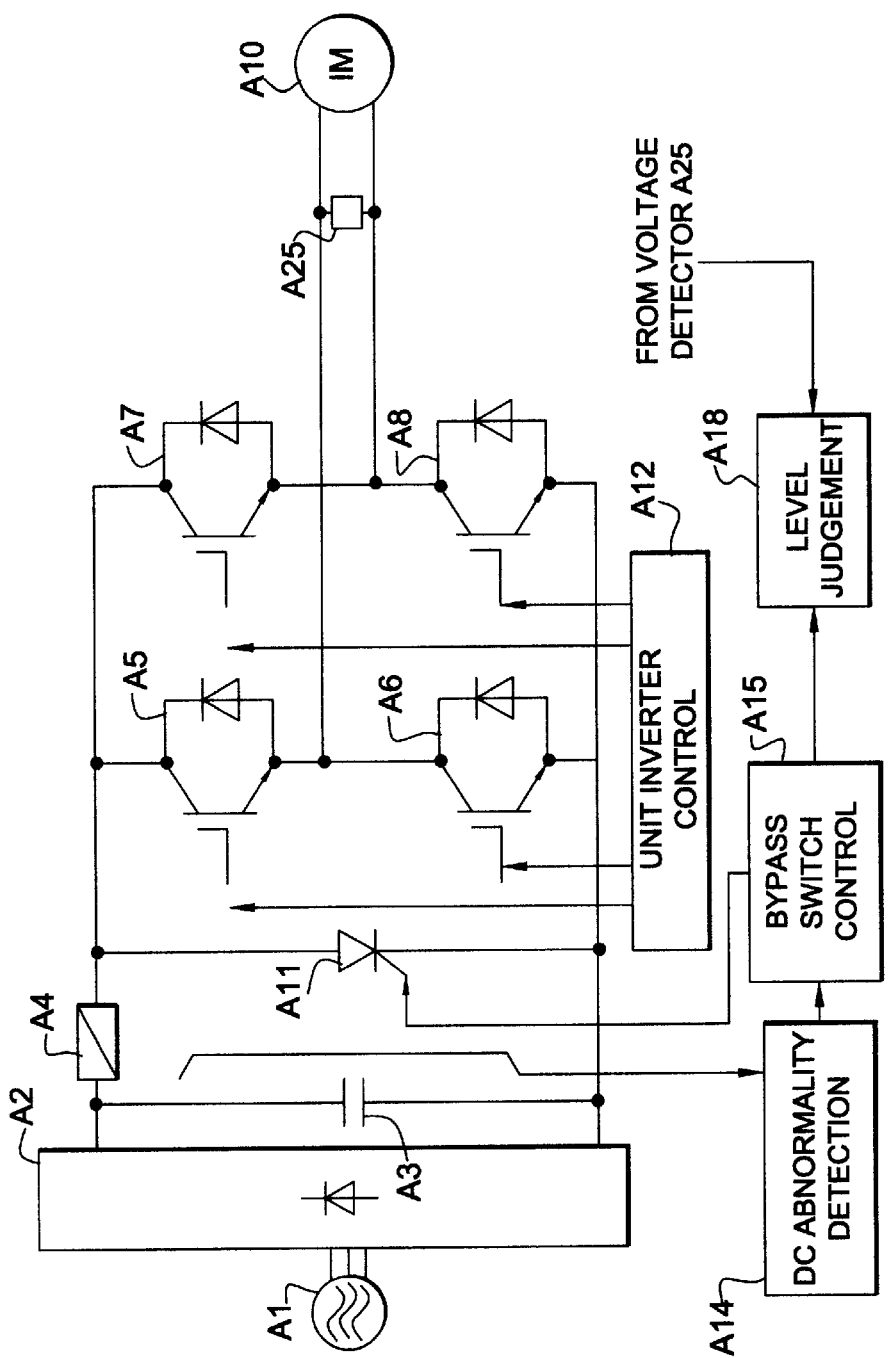
FIG. 37 is a circuit diagram showing essential portions only for explaining a thirty-third embodiment of a multiple inverter system of the present invention.

FIG. 37 is a block diagram partially showing the the thity-third embodiment. In FIG. 37, likewise FIG. 33, one unit inverter A9, the unit inverter control means A12 which controls the firing of the semiconductor devices A5, A6, A7, A8 of the unit inverter A9, and a bypass circuit comprising the bypass switch A11, the DC abnormality detecting means A14, a level juding means A18 and the bypass switch control means A15, which will be described later, only are shown but in the actual configuration, there are a plurality of unit inveters A9 and each of the unit inverters A9 is provided with above-mentioned bypass circuit, respectively.

The level judging means 18 detects the abnormality when the output voltage of the unit inverter A9 detected by the voltage detecting means A25 exceeds the specified range against a reference value. When a judging signal is obtained from the level judging means 18 and a detecting signal is output from the DC abnormality detecting means A14, a circuit closing command is output from the bypass control means A15 to the bypass switch A11 as in FIG. 33.

Thirty-Fourth Embodiment

Figure 38:
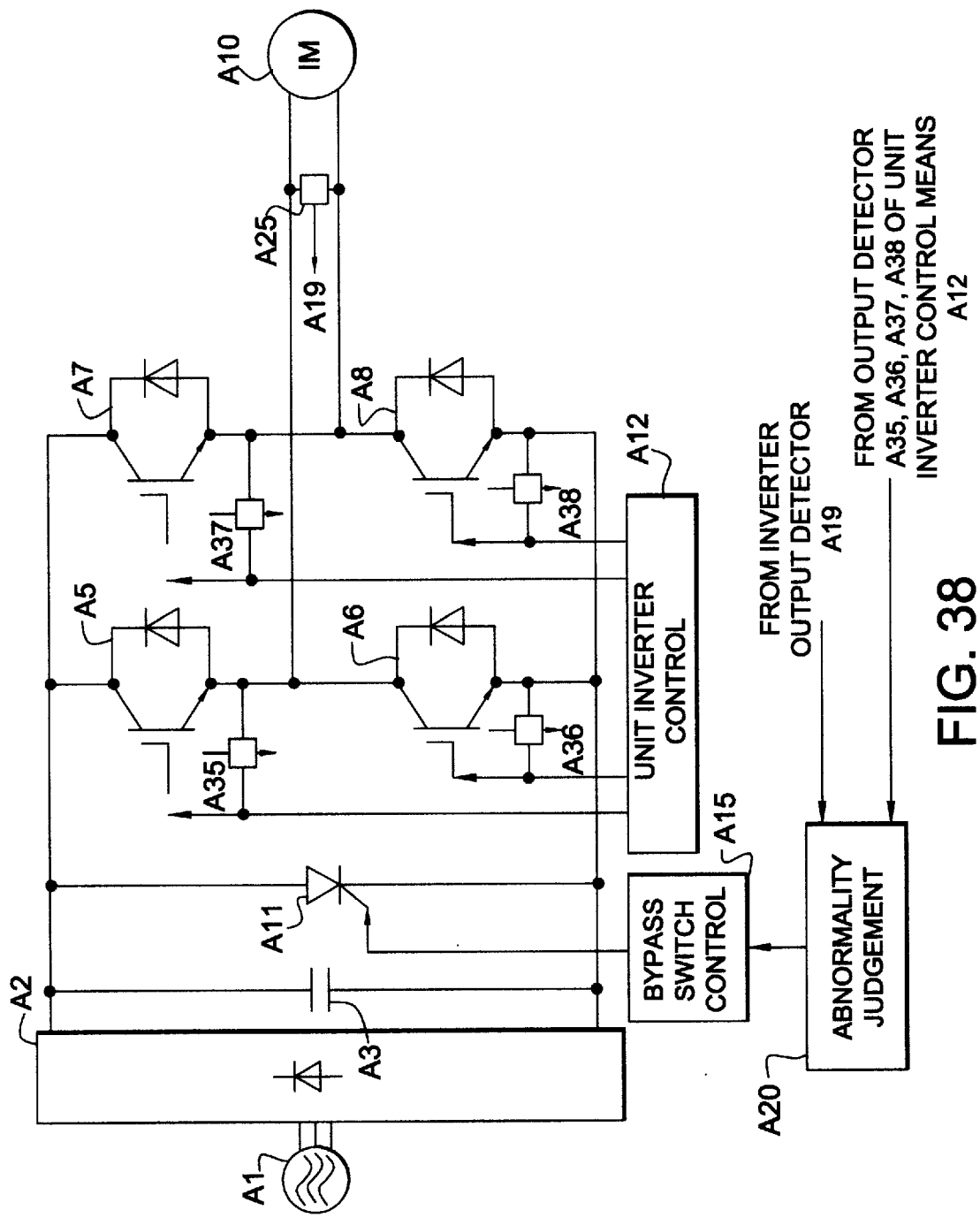
FIG. 38 is a circuit diagram showing essential portions for explaining a thirty-fourth embodiment of a multiple inverter system of the present invention.

FIG. 38 is a block diagram partially showing the thirty-fourth embodiment. In FIG. 38, likewise FIG. 33, one unit inverter A9, the unit inverter control means A12 which controls the firing of the semiconductor devices A5, A6, A7, A8 of the unit inverter A9, and a bypass circuit comprising the bypass switch A11, the output deetecting means A35, A36, A37, A38, the inverter output detector A19 and the abnormal judging means A20, which are described later, only are shown but in the actual configuration, there are a plurality of unit inveters A9 and each of the unit inverters A9 is provided with the above-mentioned bypass circuit.

FIG. 38 differs from FIG. 33 in that the abnormal judging means 20 inputs the output voltage detected by the inverter output detector A19 and the voltage detected by any one of the output detectors A35–A38 of the unit inverter control means A12 and detects a fault resulting from the abnormality of the unit inverter control means A12, that is, an external factor from the relationship of both voltages.

Thirty-Fifth Embodiment

Figure 39:
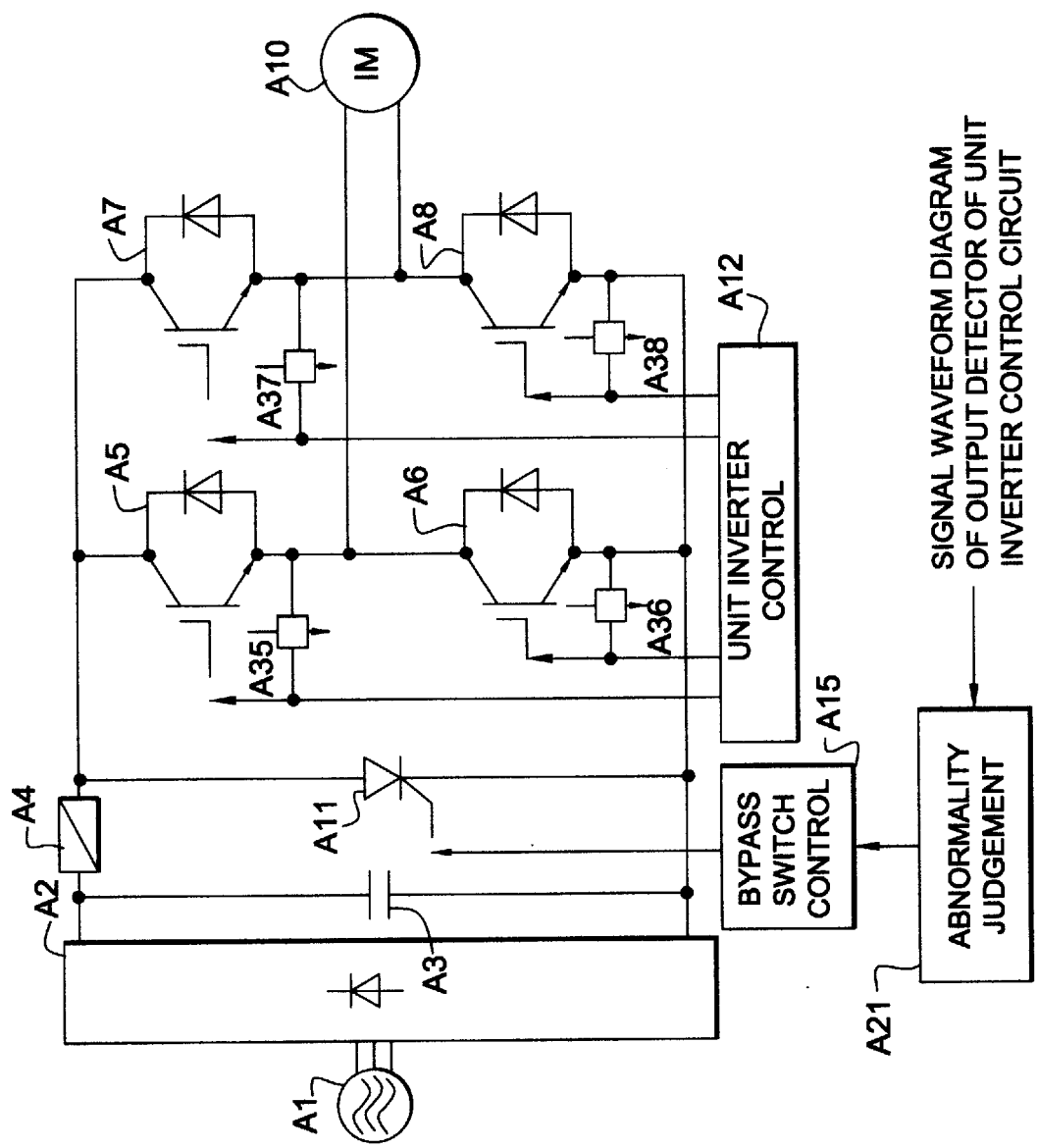
FIG. 39 is a circuit diagram showing essential portions only for explaining a thirty-fifth embodiment of a multiple inverter system of the present invention.

FIG. 39 is a block diagram partially showing the thirty-fifth embodiment. In FIG. 39, likewise FIG. 33, one unit inverter A9, the unit inverter control means A12 which controls the firing of the semiconductor devices A5, A6, A7, A8 of the unit inverter A9, and a bypass circuit comprising the bypass switch A11, the output detecting means A35, A36, A37, A38 and the abnormality judging means A21 only, which are described later, are shown but in the actual configuration, there are a plurality of unit inveters A9 and each of the unit inverters A9 is provided with the above-mentioned bypass circuit.

FIG. 39 differs from FIG. 38 only in that the voltage with volage wave detected by the output detecting means A35~A38 is input to the abonomality judging means 21, and abnomality based on an external factor is judged by comparing this voltage wave with a refernce voltage wave.

Thirty-Sixth Embodiment

Figure 40:
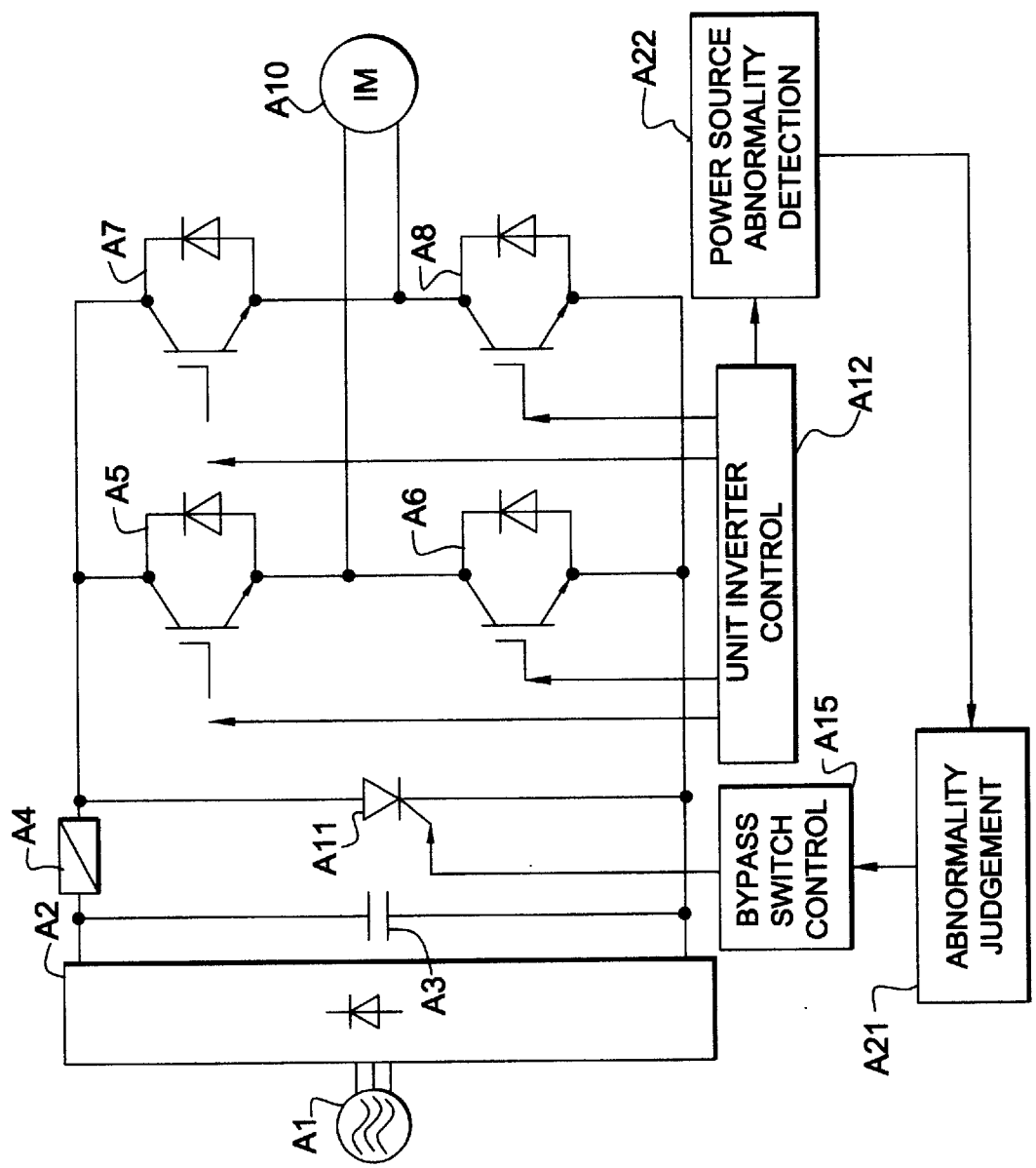
FIG. 40 is a circuit diagram showing essential portions only for explaining a thirty-sixth embodiment of a multiple inverter system of the present invention.

FIG. 40 is a block diagram partially showing the thirty-sixth embodiment. In FIG. 39, likewise FIG. 33, one unit inverter A9, the unit inverter control means A12 which controls the firing of the semiconductor devices A5, A6, A7 and A8 of the unit inverter A9, and a bypass circuit comprising the bypass switch A11, the abnormality judging means A21 and the power source abnormality detecting means A22 only, which are described later, are shown but in the actual configuration, there are a plurality of unit inveters A9 and each of the unit inverters A9 is provided with the above-mentioned bypass circuit.

FIG. 40 differs from FIG. 38 in that the power source abnormality detecting means A22 detects the power source abnormality of the unit inverter control means A12, inputs this detected ouput to the abnormality judging means A21 and by comparing this detected output wih a reference voltage, judges the abnormality by an external factor.

Thirty-Seventh Embodiment

In FIG. 32, it is needless to say that as the configuration of multiple inverters, U, V and W phase inverters A24U1, A24U2, A24U3, A24V1, A24V2, A24V3, A24W1, A24W2 and A24W3 are combined by 3 units and connected each other and fuses A4U1, A4U2, A4U3, A4V1, A4V2, A4V3, A4W1, A4W2 and A4W3 are connected to each unit inverter likewise the embodiments described above and in addition, a bypass circuit in the same structure as in the embodiments described above is provided to each unit inverter.

Thirty-Eighth Embodiment

Figure 41:
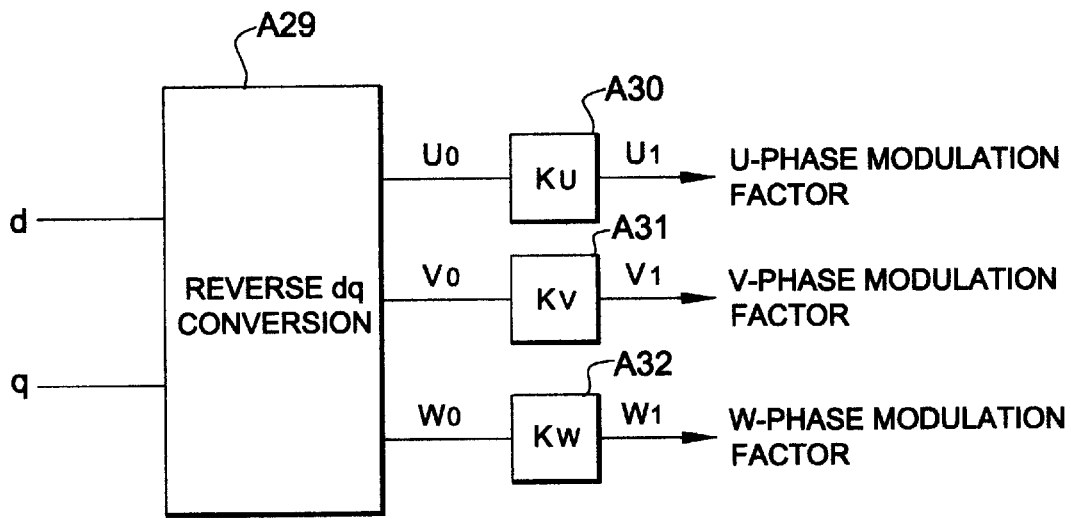
FIG. 41 is a circuit diagram showing essential portions only for explaining a thirty-seventh embodiment of a multiple inverter system of the present invenion.
Figure 42:
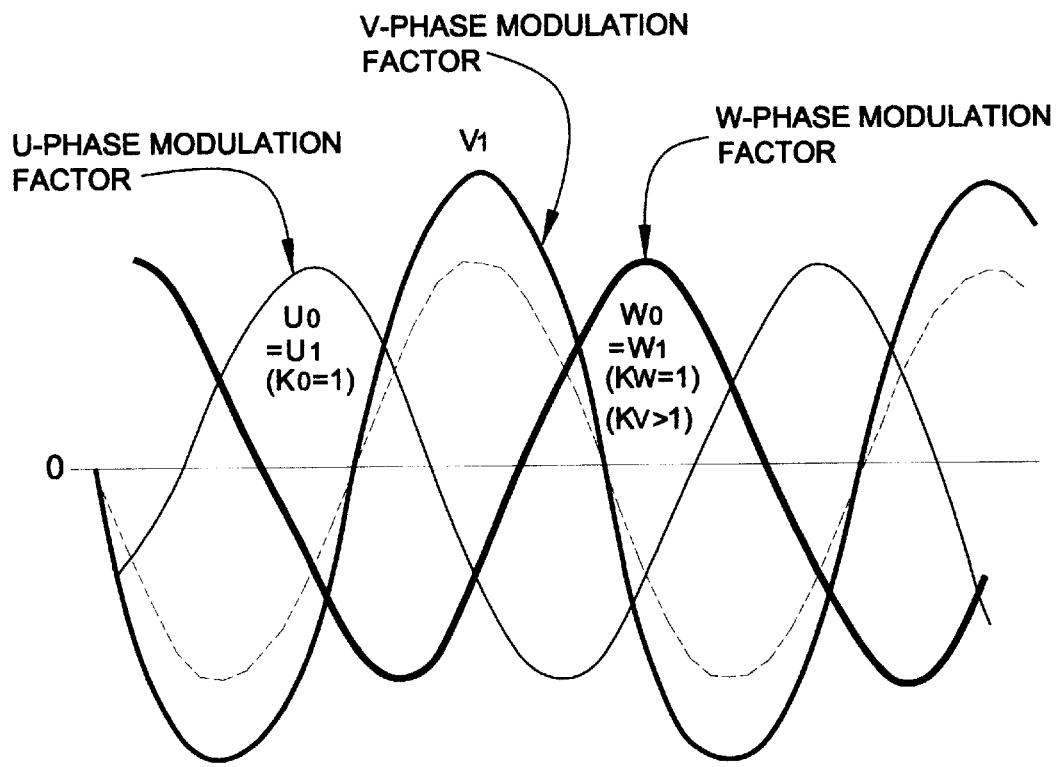
FIG. 42 is a circuit diagram showing essential portions only for explaining a thirty-eighth embodiment of a multiple inverter system of the present invention.

FIG. 41 and FIG. 42 are diagrams for explaining the thirty-eighth embodiment of the present invention. FIG. 41 shows that the main circuit is a three-phase circuit as in FIG. 32 and partially shows the PWM control circuit A67 shown in FIG. 34, A29 shows a reverse dq converter and A30, A31 and A32 show proportional computing units.

In such the structure as described above, when one unit inverter becomes faulty for short-circuit, etc. and the operation is continued by the reamining healthy unit inverters, the modulation factor of the unit inverter in a phase causing above-described abnormality is increased to more than one time.

The output voltage waveforms in respective phases of a multiple inverters in this case are shown in FIG. 42 and it is possible to compensate the output voltage drop of a group of inverters in respective phases resulting of decrease of unit inverters.

Thirty-Ninth Embodiment

In a multiple inverter system in the same structure as in FIG. 38, in the main circuit shown in FIG. 32, the number of unit inverters in the healthy phase are operated corresponding to, for instance, the number of unit inverters in the phase detected by each abnormal operation detecting means A13.

Deformed Example

In the above embodiments, a case where such semiconductor switch as a thyristor was used as a bypass switch A11 was exlained but a mechanical switch maybe used instead of a semiconductor switch. A mechnical switch has a smaller thermal loss than a semiconductor switch; however, on the other hand, as the operation is slower than a semiconductor switch, it is not possible to continuously operate by protecting while operating.

In the above embodiments, a case where all of unit inverters in each phase are operated when the inverters are properly bridged was explained. When the inverter bridge is proper, at least one of unit inverters of each phase may be used as a standby inverter. In this case, unit inverters of respective phases that are operated and those not operated as standby inverters are automatically selected or manually selected by operator using, for instance, a copper bar.

Figure 43A:
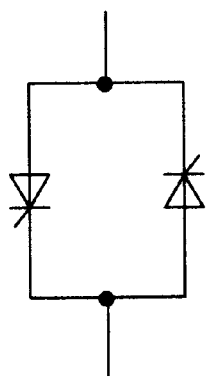
FIG. 43 is a diagram for explaining deformed examples of the embodiments of a multiple inverter system of the present invention.
Figure 43B:
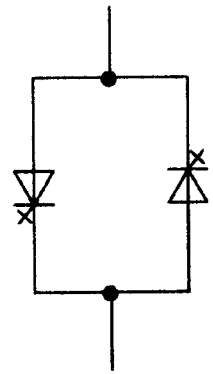
Figure 43C:
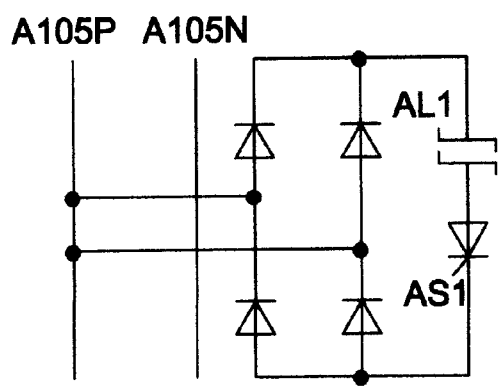
Figure 43D:
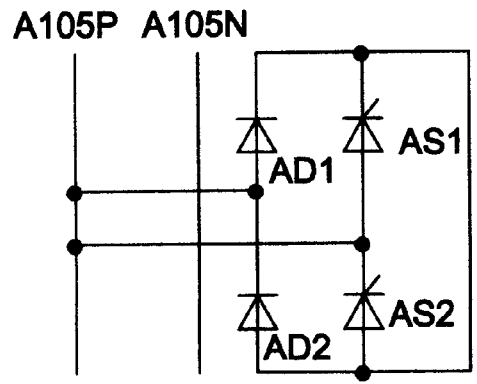

Further, semiconductor devices comprising unit inverters are explained by taking IGBT as an example in the above embodiments, antiparallelly connected thyristors shown in FIG. 43(a) or antiparallelly connected GTOs shown in FIG. 43(b) are usable. Further, a series circuit comprising a semiconductor device AS1 with a short-circuit control pole and a saturable reactor AL1 may be connected to the diode bridge output side as shown in FIG. 43(c). In addition, as shown In FIG. 43(d), the system may be constructed using the bridge connected diodes AD1, AD2 and semiconductor devices with a control pole AS1, AS2 as a bypass switch to bypass the output of the unit inverter A9 so as to short circuit its DC output.

According to the present invention described above, by combining transformers having secondary windings with unit inverters, it is possible to provide a small-sized economical multiple inverter system and its control method capable of obtaining high-voltage output, reducing higher harmonic to load side and also, reducing harmonic current of a power source system swithout requiring output transformers.

In addition, according to the present invention, it is possible to provide a multiple inverter system capable of continuouly operating AC load even when short-circuit, other troubles are caused on at least one of unit inverters without suspending the operation of remainng healthy unit inverters.

Obviously, numerous additional modifications and variations of the present invention are possible in light of the above teachings. It is therefore to be understood that within the scope of the appended claims, the invention may be practiced otherwise than as specially described herein.

What is claimed as new and desired to be secured by Letter Patent of the United States is:

1. A multiple inverter system, comprising:
   at least one input transformer having secondary windings; and
   a plurality of unit inverter cells connected in series for n-stages (where n is an integer and n≧3) to compose multiple phases, supplies electric power to a multiple phase load in combination with said input transformers,
   said at least one input transformer being provided with 3n sets of three-phase windings at the secondary side and the secondary windings of said transformers are in phase as connected to the inverter cells at each phase output line.

2. A multiple inverter system comprising:
   at least one input transformer having a plurality of three-phase secondary windings;
   at least one three-phase inverter; and
   a plurality of single-phase inverter cells,
   said single-phase inverter cells being connected in series for a plurality of stages (n−1) to compose multiple phases and connected to each of the same phases of said three-phase inverters to supply electric power to a multiple phase load.

3. A multiple inverter system, comprising:
   a plurality of input transformers having secondary windings; and
   a plurality of unit inverter cells connected in series for n-stages (where n≧3) to compose multiple phases, supplies electric power to a multiple phase load in combination with said input transformers, said plurality of unit inverter cells being connected to said secondary windings,
   wherein said input transformers are provided with 3n sets of three-phase windings at the secondary side, and
   wherein secondary windings of said transformers are connected to a stage of said plurality of unit inverter cells in which each secondary winding of a stage is out of phase with the other secondary windings of said stage.

4. A multiple inverter system according to claim 1, wherein:
   n-units of said input transformers are provided to n-units of serially connected unit inverter cells for multiple phases, said input transformer having three sets of three phase windings which are π/3n out of phase at secondary windings sides respectively, and
   said secondary windings which are out of phase at each phase are connected to said unit inverter cells at the n-th stage of each phase.

5. A multiple inverter system according to claim 2, wherein:
   said three-phase inverters and single-phase inverter cells at the (n−1)th stage which are serially connected for each phase are connected with the secondary windings of the π/3n out of phase transformers.

6. A multiple inverter system according to claim 1 or 2 or 3, wherein:
   the number of said input transformers are m units (where m is an integer and m≧1), each of which has 3n sets of three-phase windings at the secondary side and said unit inverter cells at the n-th stage of each phase are connected with said secondary windings which are out of phase at each phase.

7. A multiple inverter system according to claim 1 or 2 or 3, wherein:
   the number of said input transformers are m units, each of which has the same secondary windings and each phase is composed of n-sets of unit inverter cells.

8. A multiple inverter system according to claim 1 or 2 or 3, wherein:
   said secondary winding of the same phase input transformer is connected to said unit inverter cell at the n-th stage of each phase.

9. A multiple inverter system according to claim 1 or 2 or 3, wherein:
   the number of said input transformers are m units, said winding phases at the primary side of said input transformers are shifted so that the primary side is made in the 6m phase structure, and the secondary side has 3n sets of three-phase windings and said unit inverter cell at the n-th stage of each phase is connected with the out of phase secondary winding.

10. A multiple inverter system according to claim 1 or 2 or 3, wherein:
the number of input transformers are m units, said winding phases are shifted so that the primary side of said input transformers is made in the 6m structure, said secondary side of said input transformers has 3n sets of three-phase windings, said unit inverter cell at the n-th stage of each phase is connected with said secondary winding in the same phase at each phase.

11. A multiple inverter system according to claim 1 or 2 or 3, wherein:
the number of said input transformers are m units, each secondary windings of said input transformers is given with a specified reactance so that the input current does not flow intermittently in the state where the specified load current is flowing to said unit inverters.

12. A multiple inverter system according to claim 1 or 2 or 3, further comprising:
a switch capable of cutting off the circuit, being provided with at least one of three-phase winding at said primary side or said secondary side of said input transformer.

13. A multiple inverter system according to claim 1 or 2 or 3, wherein:
a neutral point clamped 3 level inverter is composed of said unit inverter cells.

14. A multiple inverter system according to claim 1 or 2 or 3, wherein:
at least one inverter circuit of a plurality of said unit inverter cells has a function to be able to operate in either the PWM control or the pulse amplitude modulation (PAM) control and other remaining unit inverters have either the PAM control function or the PWM control function only.

15. A multiple inverter system according to claim 1 or 2 or 3, wherein:
a self-turn-off semiconductor device is used as a switch to bypass the output of said unit inverter cell, said switch being connected in antiparallel between the outputs of unit inverter cells.

16. A multiple inverter system according to claim 1 or 2 or 3, wherein:
control means for controlling that at least one stage unit inverter cell does not output voltages, if the output voltage to be supplied to said load is low.

17. A multiple inverter system according to claim 15, wherein:
control means for controlling that said bypass switch of the output portion of at least said one stage unit inverter cell is operated, if said output voltage to be supplied to said load is low.

18. A multiple inverter system according to claim 15, wherein:
control means for controlling that the bypass switch of said inverter cell output portion is operated and bypass switches of other phase unit inverter cells at the same stage are also operated, if some unit inverter cell becomes defective.

19. A multiple inverter system according to claim 15, wherein:
control means for controlling that the bypass switch of said inverter cell output portion is operated and the output voltage of other phase unit inverter cell at the same state as the defective inverter cell is controlled to zero, if some unit inverter cell becomes defective.

20. A multiple inverter system according to claim 15, wherein:
control means for controlling that unit inverter cells other than the unit inverter which operates said bypass switch or controls the output voltage to zero change the PWM operating frequency of said inverter circuit to the frequency at the normal time.

21. A multiple inverter system according to claim 15, wherein:
it is in a structure that the output voltage supplied to said multiple phase load may be changed over by said switch.

22. A multiple inverter system according to claim 1 or 2 or 3, wherein:
said system is in such a structure that the output voltage may be switched due to the 6 kV system and 3 kV system, and 4.2 kV system and 2.4 kV system.

23. A multiple inverter system according to claim 1 or 2 or 3, wherein:
said system is in such a structure that the output may be taken out of each phase position at any stage of the n stages of said unit inverter cells so that the output voltage can be changed over.

24. A multiple inverter system according to claim 1 or 2 or 3, wherein:
a power regenerating function is provided for each phase at least at one stage of said unit inverters of the n stages.

25. A multiple inverter system according to claim 1 or 2 or 3, wherein:
control means for controlling that a circuit of a power regenerating function is PWM controlled so as to return a regenerated power to a power source when there is said power regeneration from said load side.

26. A multiple inverter system according to claim 1 or 2 or 3, wherein:
any unit inverter cell has a function to control a current value through PWM control and when said multiple inverter system is started, by operating said function, the current is forced to flow to said unit inverter cells of all phases and after charging them up to a preset DC voltage value, the AC power source is turned ON.

27. A multiple inverter system according to claim 1, wherein:
if there are provided m units of said input transformers, 3 n unit inverters are divided into 3 n/m units and said divided unit is combined with one input transformer as one set, and m sets are arranged.

28. A multiple inverter system according to claim 1, wherein:
if there are provided the even number of said input transformers, two units are combined back to back and arranged on one straight line.

29. A multiple inverter system according to claim 1, wherein:
if there are provided the even number of said input transformers, two units are arranged facing to each other.

30. A multiple inverter system according to claim 1, wherein:
3 n sets of three-phase secondary windings are connected so as to make percentage impedances uniform when composing secondary windings of said input transformers and out of-phase secondary windings are connected to said unit inverter cells of all phases.

31. A multiple inverter system according to claim 1, wherein:

percentage impedances of 3 n sets of three-phase secondary windings are made uniform when comprising secondary windings of said input transformers and therefore, said three-phase connection is made by respective phase windings that are wound at different locations of a three-phase core, and out-of-phase secondary windings are connected to said unit inverter cells of all phases.

32. A multiple inverter system, comprising;

a rectifier to convert AC power into DC power;

a group of inverters, which are to convert DC power of said rectifier into AC power, provided with a plurality of voltage source unit inverters composing a plurality of bridge connected semiconductor devices, the input sides of said unit inverters connected to said rectifier in parallel via smoothing capacitors, respectively, output sides of said unit inverters connected in series and also connected to an AC load;

a fuse serially connected between said rectifier and said unit inverter;

a bypass switch provided between said rectifier and unit inverter and connected in parallel with said unit inverter and forms a circuit to circulate load current when said circuit is electrically closed;

a unit inverter control means for giving a firing command to semiconductor devices composing said unit inverter in the specified order;

an abnormal operation detecting means for detecting said abnormal operating state of said unit inverter based on said AC output of said unit inverters;

a DC abnormality detecting means for detecting an abnormality of DC input of said unit inverter; and a bypass switch control means for melting said fuse on applicable to said unit inverter by giving a circuit closing command to said bypass switch corresponding to an applicable unit inverter when both of said abnormal operation detecting means and abnormal DC detecting means detect said abnormality.

33. A multiple inverter system according to claim 32, wherein:

said DC abnormality detecting means is to detect DC abnormality accompanied with said melting of said fuse.

34. A multiple inverter system according to claim 32, wherein: said DC abnormality detecting means is to detect that the DC voltage applied to said unit inverter is an overvoltage or undervoltage.

35. A multiple inverter system according to claim 31, wherein:

said abnormal operation detecting means is to detect said output AC voltage of said unit inverter and to detect an abnormality of said unit inverter when said detected voltage is above the specified range against a reference value.

36. A multiple inverter system comprising:

a rectifier to convert AC power to DC power;

a group of inverters, which are to convert DC power of said rectifier into AC power, provided with a plurality of voltage source unit inverters composing a plurality of bridge connected semiconductor devices, the input sides of which are connected in parallel with said rectifier via a smoothing capacitor and the output sides of which are connected in series and connected to an AC load;

fuses serially connected between said rectifiers and unit inverters;

bypass switches provided between said rectifiers and said unit inverters, connected in parallel with said unit inverters and form a circuit to circulate load current when said circuit is electrically closed;

a pulse width modulation unit inverter control means for giving a firing command in the specified order to semiconductor devices composing said unit inverters;

an abnormality judging means for making the judgment of troubles related to said unit inverter control means; and a bypass switch control means for melting said fuse by giving a circuit closing command to said bypass switch of applicable unit inverter when said abnormality judging means judges said abnormality.

37. A multiple inverter system according to claim 36, wherein:

said abnormality judging means makes the judgment based on either the relation of said output voltage of said unit inverter with that of said unit inverter control means, output voltage waveform of said unit inverter control means or the power source abnormality of said unit inverter control means.

38. A multiple inverter system, comprising:

a rectifier to convert AC power to DC power;

a group of inverters, which are to convert DC power of said rectifier into AC power, provided with a plurality of voltage inverters composing a plurality of bridge connected semiconductor devices, the input sides of which are connected in parallel with said rectifier via a smoothing capacitor, the output sides of which are serially connected and to an AC load;

a fuse serially connected between said rectifier and said unit inverter;

bypass switches provided between said rectifiers and said unit inverters, connected in parallel with said unit inverters and form, a circuit to circulate load current when said circuit is electrically closed;

a pulse width modulation unit inverter control means for giving a firing command in the specified order to semiconductor devices comprising said unit inverters;

an operation abnormality detecting means for detecting an abnormal operating state of said unit inverters based on said AC output of said unit inverters;

a DC abnormality detecting means for detecting abnormality of DC input of said unit inverters; and a bypass switch control means for melting said fuse by giving a circuit closing command to said bypass switch of applicable unit inverter when both of said operation abnormality detecting means and DC abnormality detecting means detect abnormality;

said system is operated by increasing the percentage modulation of said unit inverter in the phase caused abnormality out of said inverter group to more than one time by said unit inverter control means.

39. A multiple inverter system, comprising:

a rectifier to convert AC power into DC power;

a group of inverters, which are to convert DC power of said rectifier into AC power, provided with a plurality of voltage unit inverters composing a plurality of bridge connected semiconductor devices, the input sides of said unit inverters are connected to said rectifier in parallel with it via smoothing capacitors, and the output sides of which are serially connected and to an AC load;

a fuse serially connected between said rectifier and said unit inverter;

bypass switches provided between said rectifiers and said unit inverters, connected in parallel with said unit inverters and form a circuit to circulate load current when said circuit is electrically closed;

a pulse width modulation unit inverter control means for giving a firing command in the specified order to semiconductor devices composing said unit inverters;

an operation abnormality detecting means for detecting an abnormal operating state of said unit inverters based on said AC output of said unit inverters;

a DC abnormality detecting means for detecting abnormality of DC input of said unit inverters; and a bypass switch control means for melting said fuse by giving a circuit closing command to said bypass switch of applicable unit inverter when both of said operation abnormality detecting means and DC abnormality detecting means detect abnormality;

a group of healthy phase inverters are operated by adapting to the number of inverters in the phase detected by said operation abnormality detecting means.

* * * * *